(12) United States Patent
van der Linden

(10) Patent No.: US 8,443,456 B2
(45) Date of Patent: May 14, 2013

(54) PROVIDING MULTIPLE LAYERS OF SECURITY TO FILE STORAGE BY AN EXTERNAL STORAGE PROVIDER

(75) Inventor: Robert van der Linden, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 13/468,603

(22) Filed: May 10, 2012

(65) Prior Publication Data

US 2012/0297188 A1   Nov. 22, 2012

Related U.S. Application Data

(60) Provisional application No. 61/488,598, filed on May 20, 2011.

(51) Int. Cl.
*G06F 7/04* (2006.01)

(52) U.S. Cl.
USPC .......................................................... 726/28

(58) Field of Classification Search ........................ None
See application file for complete search history.

(56) References Cited

U.S. PATENT DOCUMENTS

| | | | |
|---|---|---|---|
| 7,912,856 B2* | 3/2011 | Hannel et al. .................. | 707/781 |
| 2009/0320115 A1* | 12/2009 | Dean et al. ......................... | 726/8 |
| 2010/0185847 A1* | 7/2010 | Shasha et al. .................. | 713/150 |
| 2010/0250867 A1* | 9/2010 | Bettger et al. ................. | 711/152 |

OTHER PUBLICATIONS

International Search Report and Written Opinion, PCT/US2012/037307, mailed Aug. 13, 2012.

* cited by examiner

*Primary Examiner* — Brandon Hoffman
(74) *Attorney, Agent, or Firm* — Choate Hall & Stewart LLP

(57) ABSTRACT

A method that may include detecting, by a processor of a computing device, a network communication regarding transmission of a file to an external storage provider. The method may include causing encryption of the file to obtain an encrypted file, and associating authorization information with the encrypted file. The authorization information may include one or more restrictions on access to the encrypted file. The method may include transmitting the encrypted file to the external storage provider, and intercepting a request for access to the file. The method may include identifying requestor information regarding a requestor associated with the request, and determining, using the requestor information and a portion of the authorization information, that the requestor is authorized to access the encrypted file. The method may include causing decryption of the encrypted file to obtain the original file, and providing, to the requestor, by the processor, access to the original file.

20 Claims, 26 Drawing Sheets

PROVIDING MULTIPLE LAYERS OF SECURITY TO FILE STORAGE BY AN EXTERNAL STORAGE PROVIDER

RELATED APPLICATIONS

The present application claims priority to U.S. Provisional Application No. 61/488,598 entitled "Systems and Methods for Providing Multiple Layers of Security to File Storage by an External Storage Provider" and filed May 20, 2011, the contents of which is hereby incorporated by reference in its entirety.

BACKGROUND

Software as a service solution (SaaS) for file storage, also known as storage solutions provided in "the Cloud," may be used to provide users, corporations, or other entities (e.g., Cloud storage customers) with storage services without requiring that the Cloud storage customers purchase storage hardware. For example, a corporation or other enterprise may pay an external storage provider for a Cloud-based file storage solution to provide flexible storage capacity that is accessible by any member (e.g., employee) of the corporation or other enterprise connected to the Internet.

SUMMARY

The features of the present disclosure may be of general applicability to any situation where multiple layers of security are desired across a number of computing entities (e.g., computing devices, storage media elements, etc.). In particular, the present disclosure may provide benefits within an enterprise network in any situation where it is desirable to manage multiple layers of security across two or more computing entities. The present disclosure, in certain described embodiments, provides examples of systems and methods whereby one layer of security may be implemented to manage and encrypt a data file, while a different layer of security may manage and encrypt a storage location for the data file.

In one aspect, the present disclosure describes a method that may include detecting, by a processor of a computing device, a network communication regarding transmission of a file to an external storage provider. The method may include causing, by the processor, encryption of the file to obtain an encrypted file, and associating, by the processor, authorization information with the encrypted file. The authorization information may include one or more restrictions on access to the encrypted file. The method may include transmitting the encrypted file to the external storage provider, and intercepting, by the processor, a request for access to the file. The method may include identifying, by the processor, requestor information regarding a requestor associated with the request, and determining, by the processor, using the requestor information and a portion of the authorization information, that the requestor is authorized to access the encrypted file. The method may include causing, by the processor, decryption of the encrypted file to obtain the original file, and providing, to the requestor, by the processor, access to the original file.

The authorization information may include an audience class. The authorization information may include an access list. The method may include, prior to transmitting the encrypted file to the external storage provider, causing encryption of an encryption key to obtain an encrypted encryption key, where the encrypted encryption key is transmitted to the external storage provider. Causing decryption of the encrypted file may include causing, by the processor, decryption of the encrypted encryption key to obtain the original encryption key, and causing, by the processor, decryption of the encrypted file using the original encryption key.

Associating authorization information with the encrypted file may include adding authorization information to a metadata portion of the encrypted file. Determining that the requestor is authorized to access the encrypted file may include accessing the authorization information in the metadata portion of the encrypted file, and referencing the requestor information to the authorization information. The method may include transmitting the request to access the file to the external storage provider. Determining that the requestor is authorized to access the encrypted file may occur prior to transmitting the request to access the file.

Detecting the network communication regarding transmission of the file may include intercepting the network communication originating within an Enterprise network, where the computing device forms a portion of the Enterprise network and the Enterprise network is private in relation to a second network. Transmitting the encrypted file may include transmitting the encrypted file to the external storage provider across the second network. The method may include monitoring, by the processor, traffic within the Enterprise network.

The method may include determining, by the processor, a storage location of the encrypted file, where the storage location includes a location managed by the external storage provider. The method may include causing, by the processor, encryption of the storage location. Causing encryption of the storage location may include instructing a process executing on a second computing device to encrypt the storage location, where the external storage provider includes the second computing device.

Providing access to the original file may include providing a file indicator to the requestor, where the file indicator includes a location of the original file. The method may include mounting, by the processor, a virtual disk volume, where the location of the original file includes a location on the virtual disk volume.

In one aspect, the present disclosure describes a system including a processor, and memory storing instruction thereon, where the instructions when executed may cause the processor to detect a network communication regarding transmission of a file to an external storage provider, and cause encryption of the file to obtain an encrypted file. The instructions when executed may cause the processor to associate authorization information with the encrypted file. The authorization information may include one or more restrictions on access to the encrypted file. The instructions when executed may cause the processor to transmit the encrypted file to the external storage provider, and intercept a request for access to the file. The instructions when executed may cause the processor to identify requestor information regarding a requestor associated with the request, and determine, using the requestor information and a portion of the authorization information, that the requestor is authorized to access the encrypted file. The instructions when executed may cause the processor to cause decryption of the encrypted file to obtain the original file, and provide, to the requestor, access to the original file.

In one aspect, the present disclosure describes a non-transient computer readable medium having instructions stored thereon that, when executed, may cause a processor to detect a network communication regarding transmission of a file to an external storage provider, and cause encryption of the file to obtain an encrypted file. The instructions when executed may cause the processor to associate authorization information with the encrypted file. The authorization information may include one or more restrictions on access to the encrypted file. The instructions when executed may cause the processor to transmit the encrypted file to the external storage provider, and intercept a request for access to the file. The instructions when executed may cause the processor to identify requestor information regarding a requestor associated with the request, and determine, using the requestor information and a portion of the authorization information, that the requestor is authorized to access the encrypted file. The instructions when executed may cause the processor to cause decryption of the encrypted file to obtain the original file, and provide, to the requestor, access to the original file.

In one aspect, the present disclosure describes a method that may include detecting, by a processor of a computing device, within a private network, a network communication regarding transmission of a file. The network communication may have originated within the private network. The network communication may include a destination address of an external storage provider, where a second network includes the external storage provider, and the second network is outside of the private network. The method may include causing, by the processor, encryption of the file to obtain an encrypted file, determining, by the processor, an encryption key to associate with the encrypted file, and transmitting the encrypted file and the encryption key to the external storage provider.

In one aspect, the present disclosure describes a system including a processor, and a memory storing instructions thereon, where the instructions when executed may cause the processor to detect, within a private network, a network communication regarding transmission of a file. The network communication may have originated within the private network. The network communication may include a destination address of an external storage provider, where a second network includes the external storage provider, and the second network is outside of the private network. The instructions when executed may cause the processor to cause encryption of the file to obtain an encrypted file, determine an encryption key to associate with the encrypted file, and transmit the encrypted file and the encryption key to the external storage provider.

The instructions, when executed, may further cause the processor to, prior to transmitting the encrypted file and the encryption key, encrypt the encryption key using a shared key. The instructions, when executed, may further cause the processor to associate authorization information with the encrypted file, where the authorization information includes one or more restrictions on access to the encrypted file.

In one aspect, the present disclosure describes a non-transient computer readable medium having instructions stored thereon that, when executed, may cause a processor to detect, within a private network, a network communication regarding transmission of a file. The network communication may have originated within the private network. The network communication may include a destination address of an external storage provider, where a second network includes the external storage provider, and the second network is outside of the private network. The instructions when executed may cause the processor to cause encryption of the file to obtain an encrypted file, determine an encryption key to associate with the encrypted file, and transmit the encrypted file and the encryption key to the external storage provider.

In one aspect, the present disclosure describes a method that may include intercepting, by a processor of a computing device, from a process associated with an external storage provider, a request for access to a file. The file may be stored within a private network, and a second network, outside of the private network, may include the external storage provider. The method may include identifying, by the processor, the requestor as having encryption-only access to the file. The method may include assigning, by the processor, authentication information to the file, where the authentication information may include one or more restrictions on access to the file. The method may include causing, by the processor, encryption of the file to obtain an encrypted file, where the file is encrypted using a first encryption key. The method may include adding, by the processor, an indication of the authentication information to the encrypted file. The method may include causing, by the processor, encryption of a second encryption key to obtain an encrypted encryption key, where the second encryption key is encrypted using a shared key. The method may include providing, by the processor, the encrypted file and the encrypted encryption key to the requestor.

In one aspect, the present disclosure describes a system including a processor, and a memory storing instructions thereon, where the instructions when executed may cause the processor to intercept a request, from a process associated with an external storage provider, for access to a file. The file may be stored within a private network, and a second network, outside of the private network, may include the external storage provider. The instructions when executed may cause the processor to identify the requestor as having encryption-only access to the file. The instructions when executed may cause the processor to assign authentication information to the file, where the authentication information may include one or more restrictions on access to the file. The instructions when executed may cause the processor to cause encryption of the file to obtain an encrypted file, where the file is encrypted using a first encryption key. The instructions when executed may cause the processor to add an indication of the authentication information to the encrypted file. The instructions when executed may cause the processor to cause encryption of a second encryption key to obtain an encrypted encryption key, where the second encryption key is encrypted using a shared key. The instructions when executed may cause the processor to provide the encrypted file and the encrypted encryption key to the requestor.

In one aspect, the present disclosure describes a non-transient computer readable medium having instructions stored thereon that, when executed, may cause a processor to intercept a request, from a process associated with an external storage provider, for access to a file. The file may be stored within a private network, and a second network, outside of the private network, may include the external storage provider. The instructions, when executed, may cause the processor to identify the requestor as having encryption-only access to the file. The instructions, when executed, may cause the processor to assign authentication information to the file, where the authentication information includes one or more restrictions on access to the file. The instructions, when executed, may cause the processor to cause encryption of the file to obtain an encrypted file, where the file is encrypted using a first encryption key. The instructions, when executed, may cause the processor to add an indication of the authentication information to the encrypted file. The instructions, when executed, may cause the processor to cause encryption of a second encryption key to obtain an encrypted encryption key, where the second encryption key is encrypted using a shared key. The instructions, when executed, may cause the processor to provide the encrypted file and the encrypted encryption key to the requestor. The first encryption key may be the second encryption key.

BRIEF DESCRIPTION OF THE FIGURES

The foregoing and other objects, aspects, features, and advantages of the disclosure will become more apparent and better understood by referring to the following description taken in conjunction with the accompanying drawings, in which.

Figure 1A:
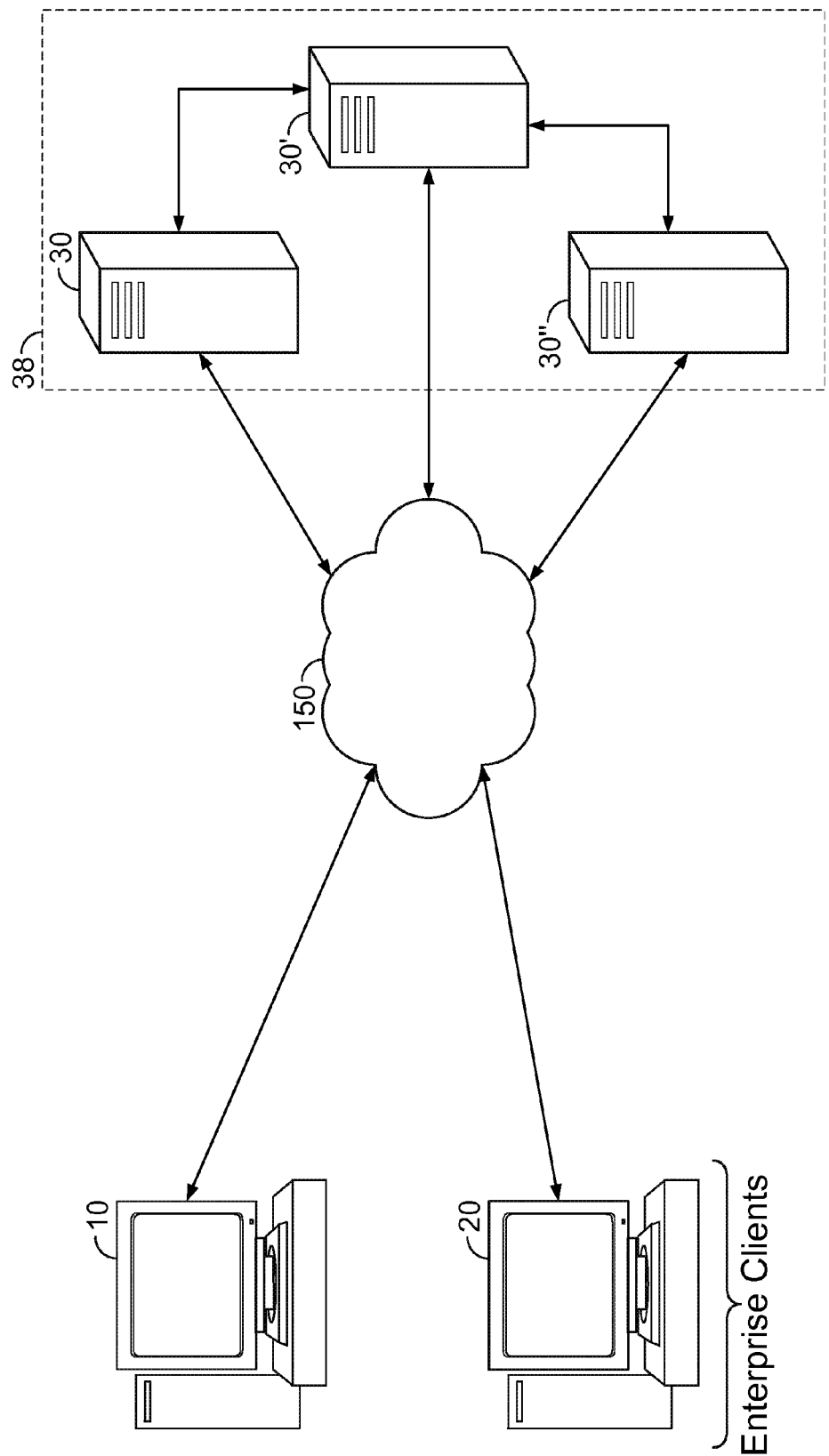
FIGS. 1A-1C are block diagrams depicting embodiments of a network environment including client machines in an enterprise network connecting to an external storage provider.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

For purposes of reading the description of the various embodiments below, the following descriptions of the sections of the specification and their respective contents may be helpful:

Section A describes various example encryption schemes and standards which may be useful for practicing the embodiments described herein;

Section B describes an example network environment and computing environment which may be useful for practicing embodiments described herein;

Section C describes example systems and methods for secure handling of data accessed by synchronization programs;

Section D describes example systems and methods for providing multiple layers of security for data storage, including data storage by an external storage provider.

A. Encryption Schemes & Standards

This section describes a variety of encryption schemes, standards, protocols, or functions which may be used with the systems and methods of the present disclosure.

Throughout this specification, reference is made to a "hash function," "hash," or "hashing." These terms are in reference to any procedure or mathematical function that receives data as an input and provides a given output in response to said input. Said output may be referred to as a hash value, or may be referred to as a message digest. The output of a hash may be a single datum or integer. The output of a hash may be a fixed-size bit string. A hash function may rely on one or more keys to accomplish said hashing. Examples of hash functions known in the art include MD2 (Message-Digest algorithm), MD4, MD5, SHA-0 (Secure Hash Algorithm), SHA-1, SHA-2, GOST, HAVAL, PANAM, RadioGatun, RIPEMD, Tiger, and WHIRLPOOL.

Throughout this specification, reference is made to a "public key," "public keys," and "public key encryption." These terms are in reference to any methods for transforming data into a form that can only be interpreted by the intended recipient, recipients, or audience. Public key encryption methods may involve the use of asymmetric key algorithms, where a key used to encrypt data is different from the key used to decrypt the data. This allows the key with which to encrypt said data, the "Public Key" to be shared widely. Integrity of security may be maintained because the separate key with which to decrypt the encrypted information remains secret. The secret key may also be referred to as a private key, and the combination of a public key and corresponding private key may be referred to as a public-private key pair. Thus, public key encryption does not necessarily require a secure initial exchange of one or more secret keys. Examples of asymmetric key implementations include DSS, RSA Encryption Algorithm, PGP, Internet Key Exchange, ZRTP, SSH, SSL, TLS, and SILC.

It is understood that throughout this disclosure, where public keys or public key encryption is used or disclosed, one could also alternatively use any other form of encryption to successfully implement the systems and methods disclosed herein, including private key encryption or any other form of encryption.

Throughout this specification, reference is made to encryption. Encryption may refer to any means for transforming data from an interpreted form and securing it by a process that renders the data uninterpretable to anyone but those with the means to decrypt the encrypted data. Encryption may refer to a wide variety of encryption standards and techniques, including private key and public key encryption. Encryption and decryption may be accomplished via a system implementing passwords, keys, or a combination of both. Encryption schemes may include symmetric-key encryption schemes where secret keys are exchanged between the party seeking to encrypt data and the party seeking to decrypt data. Such schemes may also be referred to as "shared secret" or "pre-shared" encryption schemes. Examples of such encryption schemes may include the Advanced Encryption Standard, Blowfish, Twofish, Serpent, CASTS, RC4, 3DES and IDEA.

It is understood that throughout this disclosure, where symmetric-key, shared secret encryption, or any other form of encryption is used or disclosed, one could also alternatively use any other form of encryption to successfully implement the systems and methods disclosed herein, including public key encryption or any other form of encryption.

Throughout this specification, reference may be made to a "shared key" or "sharing keys" for the purposes of encryption or decryption. Shared keys are keys that may be shared between a particular group of users. A shared key may be any type or form of key used in any type or form of encryption scheme or standard. In some embodiments, a shared key may be unique to a particular file or may be shared with only a single user, application, or process. In some embodiments, a shared key may be an asymmetric private/public key pair.

B. Network and Computing Environment

Referring now to FIG. 1A, an embodiment of a network environment is depicted. In brief overview, the network environment may include one or more client machines 10 and 20 (also generally referred to as local machine(s), client(s), client node(s), client machine(s), client computer(s), client device(s), endpoint(s), or endpoint node(s)) in communication with one or more remote machines 30, 30', and 30" (also generally referred to as server(s) 30 or remote machine(s) 30) via one or more networks 150. The remote machines 30 may together create a server farm 38. The client machines 10 and 20, in some implementations, may be considered part of an enterprise network. In some embodiments, the remote machines 30, 30', 30" or 38 may provide external storage to machines 10, 20 on the enterprise network.

Figure 1B:
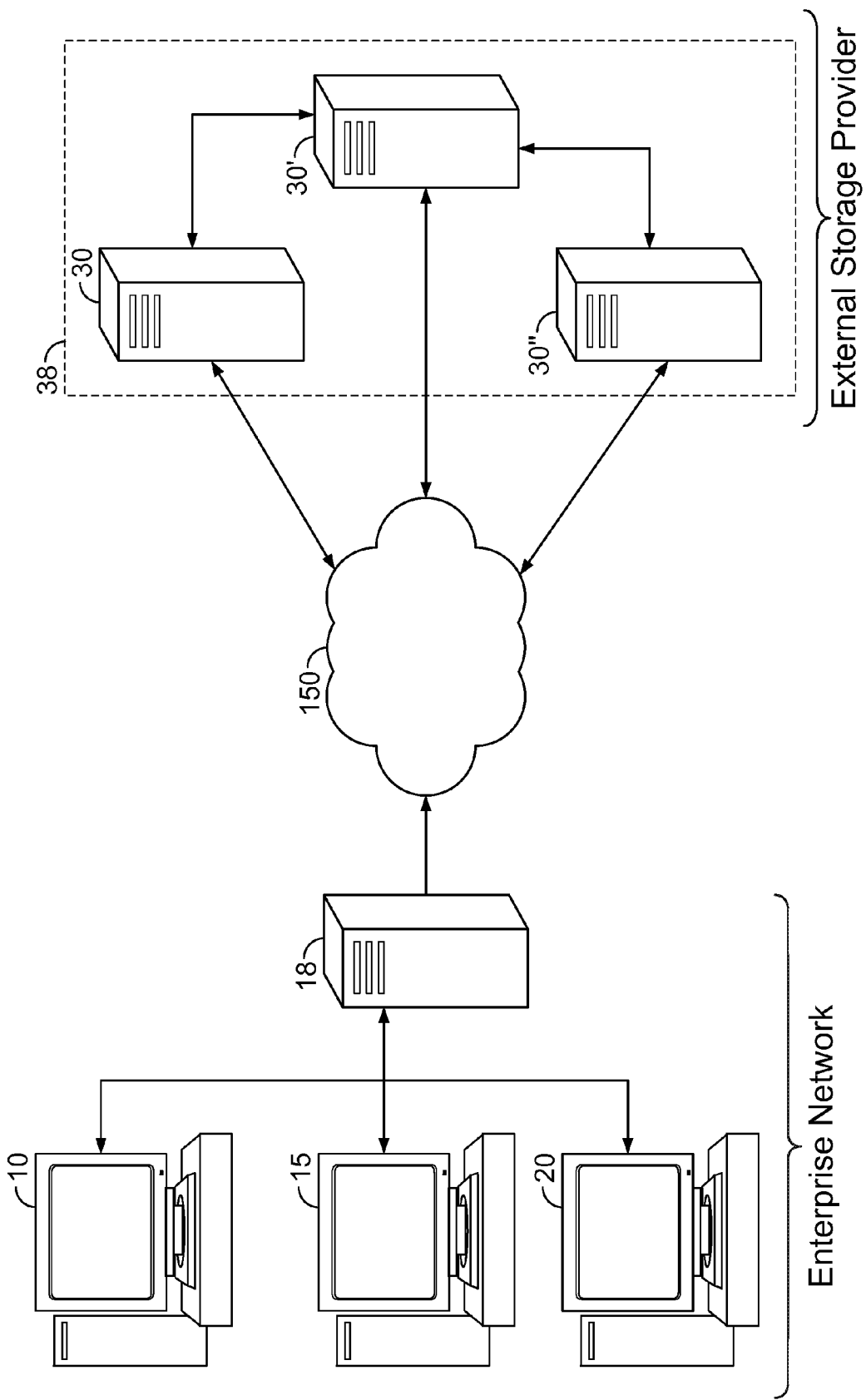

Referring now to FIG. 1B, an embodiment of a network environment is depicted. In brief overview, the network environment may include one or more client machines 10, 15, and 20 (also generally referred to as local machine(s), client(s), client node(s), client machine(s), client computer(s), client device(s), endpoint(s), or endpoint node(s)) in communication with one or more remote machines 30, 30', and 30" (also generally referred to as server(s) 30 or remote machine(s) 30) via one or more networks 150 and through machine 18 on the enterprise network.

Machine 18, in some implementations, may be a server on the enterprise network providing a secure data manager described elsewhere in this disclosure. Machine 18, in some implementations, may also be a computing device much like client machines 10, 15, or 20. In some implementations, machine 18 may be an intermediary network device or server such as a proxy server or firewall server.

Figure 1C:
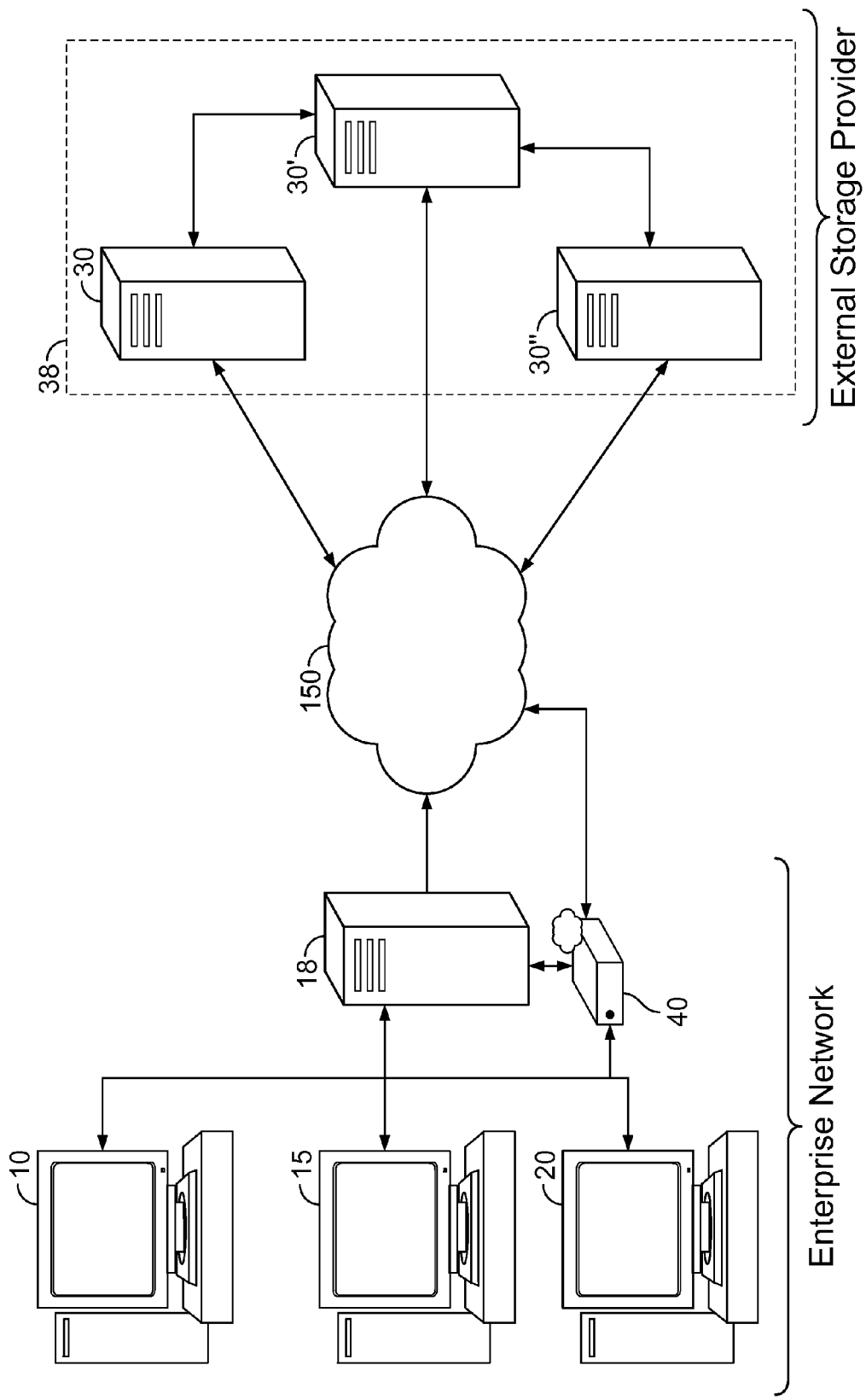

Referring now to FIG. 1C, a similar network environment as that of FIG. 1B is shown. Machine 18, in some embodiments, may be in communication with a virtual disk volume 40 which has been mounted on to the enterprise network and is in communication with remote machines 30. In one embodiment, the virtual disk volume 40 may be an identifier for the location of externally stored information which is stored by the external storage provider on remote machines 30. The identifier, for example, may be stored on any machine within the enterprise network, including machine 18, some other computing device or server in the enterprise network (e.g., client machine 10, 15, or 20), or on two or more server or computing devices within the enterprise network.

Virtual disk volume 40, in some embodiments, may be used to access data stored by an external storage provider on remote machines 30. Virtual disk volume 40, in some embodiments, may be located at a client machine (e.g., one of client machines 10, 15, and 20), a node on the network 150, intermediary machine 18, or on any other device or machine on the enterprise network.

The enterprise network, in some embodiments, may be a local-area network (LAN), such as a company Intranet, or other network capable of being secured and controlled by a single entity or enterprise. A local-area network, in some implementations, may span a wide variety of geographic locations, and can be extended to remote users by a number of technologies known in the art, such as Virtual Private Networking. An external storage provider may, in some embodiments, be any provider of storage services for files, data, and communications that is external to the enterprise network.

In some embodiments, an external storage provider may be within the same entity controlling the enterprise network. Remote machines 30, in some embodiments, may be part of the enterprise network. In some embodiments, remote machines 30 may be physically present at the same location as other components of an enterprise network.

The network 150, in some embodiments, may be a wide area network, (WAN), such as the public Internet or World Wide Web, or other network capable of connecting an enterprise network with an external storage provider. In some embodiments, the network 150 can be a private network.

The network 150 may be any type and/or form of network and may include, in some examples, any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 150 may include a wireless link, such as an infrared channel or satellite band. The topology of the network 150, in some embodiments, may be a bus, star, or ring network topology. The network 150 may be of any such network topology as known to those ordinarily skilled in the art capable of supporting the operations described herein. The network 150, in some embodiments, may include mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In some embodiments, the system may include multiple, logically-grouped remote machines 30. In one of these embodiments, the logical group of remote machines may be referred to as the server farm 38. In another of these embodiments, the remote machines 30, 30', and 30" may be geographically dispersed. In other embodiments, the server farm 38 may be administered as a single entity. In still other embodiments, the server farm 38 may include two or more of server farms. The remote machines 30 within each server farm, in some embodiments, may be heterogeneous—one or more of the remote machines can operate according to one type of operating system platform (e.g., Windows® NT, Windows® 2003, Windows® 2008, Windows® 7 and Windows® Server 2008 R2, all of which are manufactured by Microsoft Corp. of Redmond, Wash.), while one or more of the other remote machines 30 may operate on according to another type of operating system platform (e.g., UNIX® or Linux™), or any other operating system platform.

The remote machines 30 of each server farm 38, in some embodiments, may not need to be physically proximate to another remote machine 30' in the same server farm 38. Thus, the group of remote machines 30 logically grouped as the server farm 38, in some embodiments, may be interconnected using a wide-area network (WAN) connection or a metropolitan-area network (MAN) connection. For example, the server farm 38 may include remote machines 30 physically located in different continents or different regions of a continent, country, state, city, campus, or room. Data transmission speeds between remote machines 30 in the server farm 38, in some embodiments, can be increased if the remote machines 30 are connected using a local-area network (LAN) connection or some form of direct connection.

In one embodiment remote machines 30 provide data storage services external to an enterprise network. These data storage services may include, in some examples, data storage, file storage, communications storage, backup storage, archival storage, redundant storage, or any other form of storage. These data storage services, in some embodiments, may transmit and receive data using a variety of different protocols, including Transmission Control Protocol and Internet Protocol (TCP/IP). In some embodiments, the remote machines 30 may be providing external storage services such as the Dropbox™ service provided by Dropbox, Inc. of San Francisco, Calif.; the Box.net service provided by Box.net, Inc. of Palo Alto, Calif.; the SugarSync® service provided by Sugarsync, Inc. of San Mateo, Calif.; the Mozy® service provided by EMC Co. of Hopkinton, Mass.; the Carbonite® service provided by Carbonite, Inc. of Boston, Mass.; the ZumoDrive service provided by Zecter, Inc. of Burlingame, Calif.; the SkyDrive service provided by Microsoft Corp. of Redmond, Wash.; and the MobileMe service provided by Apple Inc. of Cupertino, Calif.

A client machine 10, 15 or 20, in some embodiments, may execute, operate or otherwise provide an application, which can be any type and/or form of software, program, or executable instructions such as any type and/or form of web browser, web-based client, client-server application, a thin-client computing client, an ActiveX control, or a Java™ applet, or any other type and/or form of executable instructions capable of executing on client machine 10, 15 or 20. In some embodiments, the application may be a server-based or a remote-based application executed on behalf of the local machine 10 on a particular remote machine 30. In other embodiments, the remote machine 30 may display output to the local machine 10 using any thin-client protocol, presentation layer protocol, or remote-display protocol, such as the Independent Computing Architecture (ICA®) protocol manufactured by Citrix Systems, Inc. of Ft. Lauderdale, Fla.; the Remote Desktop Protocol (RDP) manufactured by the Microsoft Corporation of Redmond, Wash.; the X11 protocol; the Virtual Network Computing (VNC) protocol, manufactured by AT&T Bell Labs; the Simple Protocol for Independent Computing Environments (SPICE), manufactured by Qumranet, Inc., of Sunnyvale, Calif., USA, and of Raanana, Israel; the Net2Display protocol, manufactured by VESA, of Milpitas, Calif.; the PC-over-IP (PCoIP) protocol, manufactured by Teradici Corporation, of Burnaby, B.C.; the TCX protocol, manufactured by Wyse Technology, Inc., of San Jose, Calif.; the THINC protocol developed by Columbia University in the City of New York, of New York, N.Y.; or the Virtual-D™ protocols manufactured by Desktone, Inc., of Chelmsford, Mass. The application can use any type of protocol and it can be, for example, a Hypertext Transfer Protocol (HTTP) client, a File Transfer Protocol (FTP) client, an Open System for CommunicAtion in Realtime (OSCAR) client by AOL of New York City, N.Y., or a Telnet client. In still other embodiments, the application may include any type of software related to voice over Internet Protocol (VoIP) communications, such as a soft IP telephone. In further embodiments, the application may include any application related to real-time data communications, such as applications for streaming video and/or audio.

The computing device 10, 15 or 20, in some examples, can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. In some embodiments, the client machine 10 may be a mobile computing device, such as a smart phone or tablet computer, including products such as the iPhone™ or iPad™ manufactured by Apple, Inc. of Cupertino, Calif.; the BlackBerry® devices manufactured by Research in Motion, Ltd. of Waterloo, Ontario, Canada; Windows Mobile™ devices manufactured by Microsoft Corp., of Redmond, Wash.; the XOOM® manufactured by Motorolla, Inc. of Libertyville, Ill.; devices capable of running the Android™ platform provided by Google, Inc. of Mountain View, Calif.; and any other type of mobile computing device.

In some embodiments, the computing device 10 may have different processors, operating systems, and input devices consistent with the device. For example, in one embodiment, the computing device 10 may be a Treo™180, 270, 600, 650, 680, 700p, 700w/wx, 750, 755p, 800w, Centro™, or Treo™ Pro smart phone manufactured by Palm, Inc. In some of these embodiments, the Treo™ smart phone may be operated under the control of the Palm OS operating system and may include a stylus input device as well as a five-way navigator device.

In other embodiments, the computing device 10 may be a mobile device, such as a Java™-enabled cellular telephone or personal digital assistant (PDA), such as the i55sr, i58sr, i85s, i88s, i90c, i95c1, i335, i365, i570, i576, i580, i615, i760, i836, i850, i870, i880, i920, i930, ic502, ic602, ic902, i776 or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 10 may be a mobile device manufactured by Nokia of Finland, or by Sony Ericsson Mobile Communications AB of Lund, Sweden. In still other embodiments, the computing device 10 may be a Blackberry® handheld or smart phone, such as the devices manufactured by Research In Motion Limited, including the Blackberry® 7100 series, 8700 series, 7700 series, 7200 series, the Blackberry 7520, the Blackberry® Pearl™ 8100, the 8700 series, the 8800 series, the Blackberry® Storm, Blackberry® Bold, Blackberry® Curve 8900, and the Blackberry® Pearl™ Flip. In yet other embodiments, the computing device 10 may be a smart phone, Pocket PC, Pocket PC Phone, or other handheld mobile device supporting Microsoft® Windows® Mobile Software. Moreover, the computing device 10, in some embodiments, may be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 1D:
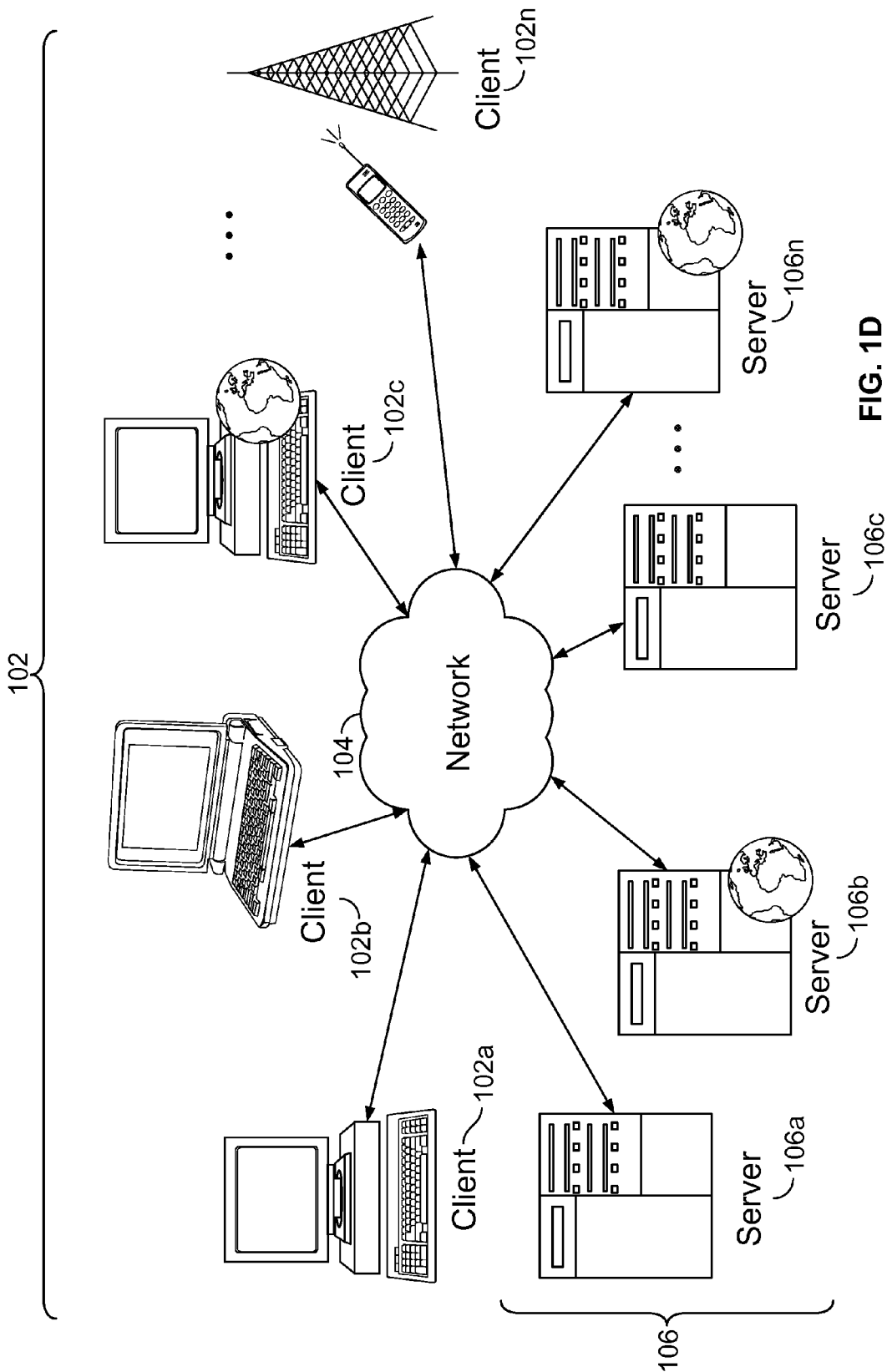
FIG. 1D is a block diagram depicting an embodiment of a network environment.

Referring now to FIG. 1D, an embodiment of a network environment is depicted. In brief overview, the network environment may include one or more local machines 102a-102n (also generally referred to as local machine(s) 102, client(s)

102, client node(s) 102, client machine(s) 102, client computer(s) 102, client device(s) 102, endpoint(s) 102, or endpoint node(s) 102) in communication with one or more remote machines 106a-106n (also generally referred to as server(s) 106 or remote machine(s) 106) via one or more networks 104. In some embodiments, one or more of the local machines 102 may have the capacity to function as both a client node seeking access to resources provided by a server and as a server providing access to hosted resources for other clients 102a-102n.

Although FIG. 1D shows the network 104 between the local machines 102 and the remote machines 106, the local machines 102 and the remote machines 106 may, in some embodiments, be on the same network 104. The network 104, in some examples, may be a local-area network (LAN), such as a company Intranet, a metropolitan area network (MAN), or a wide area network (WAN), such as the Internet or the World Wide Web. In some embodiments, there may be multiple networks 104 between the local machines 102 and the remote machines 106. In one of these embodiments, a second network (not shown) may be a private network and the network 104 may be a public network. In another of these embodiments, the network 104 may be a private network and the second network a public network. In still another embodiment, the network 104 and the second network may both be private networks. In yet another embodiment, the network 104 and the second network may both be public networks.

The network 104 may be any type and/or form of network and may include, in some examples, any of the following: a point-to-point network, a broadcast network, a wide area network, a local area network, a telecommunications network, a data communication network, a computer network, an Asynchronous Transfer Mode (ATM) network, a Synchronous Optical Network (SONET) network, a Synchronous Digital Hierarchy (SDH) network, a wireless network and a wireline network. In some embodiments, the network 104 may include a wireless link, such as an infrared channel or satellite band. The topology of the network 104 may be a bus, star, or ring network topology. The network 104 may be of any such network topology as known to those ordinarily skilled in the art capable of supporting the operations described herein. The network 104 may include mobile telephone networks utilizing any protocol or protocols used to communicate among mobile devices, including Advanced Mobile Phone Service (AMPS), Time division multiple access (TDMA), Code division multiple access (CDMA), Global System for Mobile Communications (GSM), General Packet Radio Service (GPRS) or Universal Mobile Telecommunications System (UMTS). In some embodiments, different types of data may be transmitted via different protocols. In other embodiments, the same types of data may be transmitted via different protocols.

In some embodiments, the system may include multiple, logically-grouped remote machines 106. In one of these embodiments, the logical group of remote machines 106 may be referred to as a server farm. In another of these embodiments, the remote machines 106 may be geographically dispersed. In other embodiments, a server farm may be administered as a single entity. In still other embodiments, the server farm may include a number of server farms. The remote machines 106 within each server farm, in some embodiments, can be heterogeneous one or more of the remote machines 106 can operate according to one type of operating system platform (e.g., Windows® NT, Windows® 2003, Windows® 2008, Windows® 7 and Windows® Server 2008 R2, all of which are manufactured by Microsoft Corp. of Redmond, Wash.), while one or more of the other remote machines 106 can operate on according to another type of operating system platform (e.g., UNIX® or Linux™).

The remote machines 106 of each server farm, in some embodiments, may not need to be physically proximate to another remote machine 106 in the same server farm. Thus, the group of remote machines 106 logically grouped as a server farm may be interconnected, in some examples, using a wide-area network (WAN) connection or a metropolitan-area network (MAN) connection. For example, a server farm (e.g., such as server farm 38 illustrated in relation to FIGS. 1A through 1C) may include remote machines 106 physically located in different continents or different regions of a continent, country, state, city, campus, or room. Data transmission speeds between remote machines 106 in the server farm 38, in some embodiments, may be increased if the remote machines 106 are connected using a local area network (LAN) connection or some form of direct connection.

At least one of the remote machines 106, in some examples, may be a file server, application server, web server, proxy server, appliance, network appliance, gateway, application gateway, gateway server, virtualization server, deployment server, Secure Socket Layer (SSL) Virtual Private Network (VPN) server, or firewall. In some embodiments, at least one of the remote machines 106 may provide a remote authentication dial-in user service, and, for example, may be referred to as a Remote Authentication Dial In User Service (RADIUS) server. In other embodiments, at least one of the remote machines 106 may have the capacity to function as either an application server or as a master application server. In still other embodiments, at least one of the remote machines 106 may be a blade server. In yet other embodiments, at least one of the remote machines 106 may execute as a virtual machine providing, to a user or one or more of the client computers 102, access to a computing environment.

In one embodiment, at least one of the remote machines 106 may include an Active Directory. At least one of the remote machines 106, for example, may be an application acceleration appliance. For embodiments in which at least one of the remote machines 106 is an application acceleration appliance, the particular remote machine(s) 106 may provide functionality including firewall functionality, application firewall functionality, or load balancing functionality. In some embodiments, at least one of the remote machines 106 may include an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

In some embodiments, at least one of the remote machines 106 may execute an application on behalf of a user of one of the local machines 102. In other embodiments, at least one of the remote machines 106 may execute as a virtual machine, which provides an execution session within which applications execute on behalf of a user of one of the local machines 102. In one of these embodiments, the execution session may be a hosted desktop session. In another of these embodiments, the execution session may provide access to a computing environment, which may include one or more of: an application, two or more applications, a desktop application, and a desktop session in which one or more applications may execute.

In some embodiments, at least one local machine 102 may communicate with at least one remote machine 106. In one embodiment, a particular local machine 102 may communicate directly with one of the remote machines 106 in a server farm (e.g., such as server farm 38 described in relation to FIGS. 1A through 1C). In another embodiment, the particular local machine 102 may execute a program neighborhood application to communicate with a particular remote machine 106 in a server farm. In still another embodiment, the particular remote machine 106 may provide the functionality of a master node. In some embodiments, the particular local machine 102 may communicate with the particular remote machine 106 in the server farm through the network 104. Over the network 104, in some implementations, the particular local machine 102 may, for example, request execution of various applications hosted by the remote machines 106a-106n in the server farm and receive output of the results of the application execution for display. In some embodiments, only a master node provides the functionality required to identify and provide address information associated with a particular remote machine 106b hosting a requested application.

In one embodiment, at least one of the remote machines 106 may provide the functionality of a web server. In another embodiment, the remote machine 106a may receive requests from one of the local machines 102, forward the requests to a second remote machine 106b, and respond to the request by the particular local machine 102 with a response to the request from the remote machine 106b. In still another embodiment, the remote machine 106a may acquire an enumeration of applications available to the local machines 102 and address information associated with the remote machine 106b hosting an application identified by the enumeration of applications. In yet another embodiment, the remote machine 106a may present the response to the request to the particular local machine 102 using a web interface. In one embodiment, at least one of the local machines 102 may communicate directly with the remote machine 106a to access the identified application. In another embodiment, at least one of the local machines 102 may receive output data, such as display data, generated by an execution of the identified application on the remote machine 106a.

In some embodiments, at least one of the remote machines 106 or a server farm including two or more of the remote machines 106 may be running one or more applications, such as an application providing a thin-client computing or remote display presentation application. In one embodiment, at least one of the remote machines 106 or the server farm including two or more of the remote machines 106 may execute as an application any portion of the CITRIX ACCESS SUITE by Citrix Systems, Inc., such as the METAFRAME or CITRIX PRESENTATION SERVER products, any of the following products manufactured by Citrix Systems, Inc.: CITRIX XENAPP, CITRIX XENDESKTOP, CITRIX ACCESS GATEWAY, and/or any of the Microsoft® Windows® Terminal Services manufactured by the Microsoft Corporation. In another embodiment, the application may be an ICA client, developed by Citrix Systems, Inc. of Fort Lauderdale, Fla. In still another embodiment, at least one of the remote machines 106 may run an application, which, for example, may be an application server providing email services such as Microsoft® Exchange manufactured by the Microsoft Corporation of Redmond, Wash., a Web or Internet server, or a desktop sharing server, or a collaboration server. In yet another embodiment, any of the applications may include any type of hosted service or products, such as GoToMeeting™ provided by Citrix Online Division, Inc. of Santa Barbara, Calif., WebEx™ provided by WebEx, Inc. of Santa Clara, Calif., or Microsoft® Office Live Meeting provided by Microsoft Corporation of Redmond, Wash.

One or more of the local machines 102 may execute, operate or otherwise provide an application, which can be any type and/or form of software, program, or executable instructions such as any type and/or form of web browser, web-based client, client-server application, a thin-client computing client, an ActiveX control, or a Java™ applet, or any other type and/or form of executable instructions capable of executing on one of the local machines 102. In some embodiments, the application may be a server-based or a remote-based application executed on behalf of the particular local machine 102 on a particular remote machine 106. In other embodiments, at least one of the remote machines 106 may display output to one of the local machines 102 using any thin-client protocol, presentation layer protocol, or remote-display protocol, such as the Independent Computing Architecture (ICA) protocol manufactured by Citrix Systems, Inc. of Ft. Lauderdale, Fla.; the Remote Desktop Protocol (RDP) manufactured by the Microsoft Corporation of Redmond, Wash.; the X11 protocol; the Virtual Network Computing (VNC) protocol, manufactured by AT&T Bell Labs; the SPICE protocol, manufactured by Qumranet, Inc., of Sunnyvale, Calif., USA, and of Raanana, Israel; the Net2Display protocol, manufactured by VESA, of Milpitas, Calif.; the PC-over-IP protocol, manufactured by Teradici Corporation, of Burnaby, B.C.; the TCX protocol, manufactured by Wyse Technology, Inc., of San Jose, Calif.; the THINC protocol developed by Columbia University in the City of New York, of New York, N.Y.; or the Virtual-D protocols manufactured by Desktone, Inc., of Chelmsford, Mass. The application can use any type of protocol and it can be, for example, an HTTP client, an FTP client, an Oscar client, or a Telnet client. In still other embodiments, the application may include any type of software related to voice over Internet Protocol (VoIP) communications, such as a soft IP telephone. In further embodiments, the application may include any application related to real-time data communications, such as applications for streaming video and/or audio.

Figure 1E:
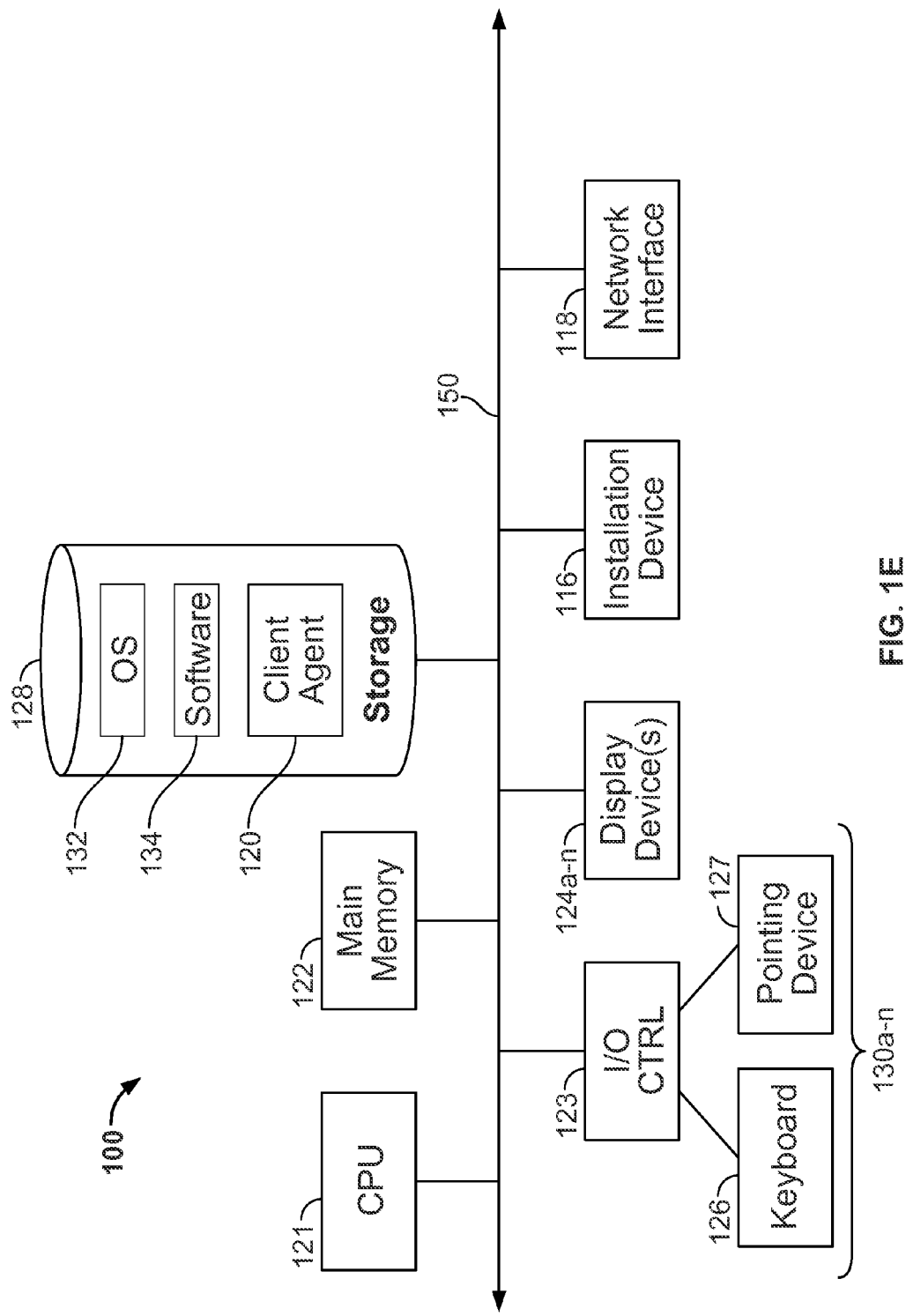
FIGS. 1E-1F are block diagrams depicting embodiments of computers.
Figure 1F:
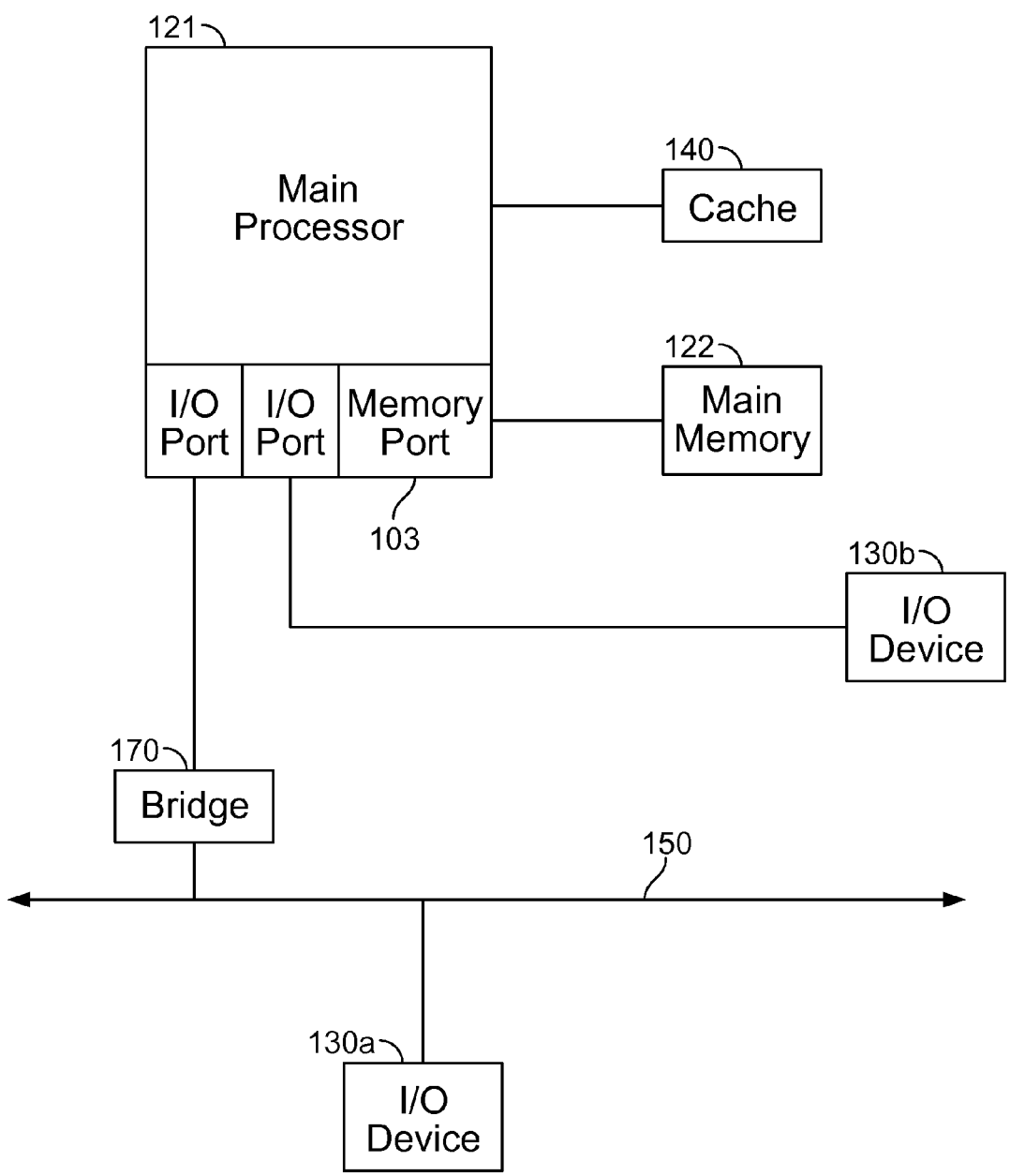

The local machines 102 and remote machines 106 may be deployed as and/or executed on any type and form of computing device, such as a computer, network device or appliance capable of communicating on any type and form of network and performing the operations described herein. FIGS. 1E and 1F depict block diagrams of an example computing device 100 useful for practicing an embodiment of the local machines 102 or remote machines 106. As shown in FIGS. 1E and 1F, each computing device 100 may include a central processing unit 121, and a main memory unit 122. As shown in FIG. 1E, the computing device 100 may include a storage device 128, an installation device 116, a network interface 118, an I/O controller 123, display devices 124a-n, a keyboard 126 and a pointing device 127, such as a mouse, track ball, touch pad, or stylus. The storage device 128 may include, without limitation, an operating system 132, software 134, and a client agent 120. As shown in FIG. 1F, each computing device 100 may also include additional optional elements, such as a memory port 103, a bridge 170, one or more input/output devices 130a, 130b (generally referred to using reference numeral 130), and a cache memory 140 in communication with the central processing unit 121.

The central processing unit 121 may represent any logic circuitry that responds to and processes instructions fetched from the main memory unit 122. In many embodiments, the central processing unit 121 may be provided by a microprocessor unit, such as, in some examples: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may include one or more memory chips capable of storing data and allowing any storage location to be directly accessed by the microprocessor 121, such as, in some examples, static random access memory (SRAM), Burst SRAM or SynchBurst SRAM (BSRAM), dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1E, the processor 121 may communicate with main memory 122 via a system bus 150 (described in more detail below). FIG. 1F depicts an embodiment of a computing device 100 in which the processor 121 may communicates directly with main memory 122 via the memory port 103. For example, in FIG. 1F the main memory 122 may be DRDRAM.

FIG. 1F depicts an embodiment in which the main processor 121 may communicate directly with cache memory 140 via a secondary bus, sometimes referred to as a backside bus. In other embodiments, the main processor 121 may communicate with cache memory 140 using the system bus 150. Cache memory 140 typically has a faster response time than main memory 122 and may typically be provided by SRAM, BSRAM, or EDRAM. In the embodiment shown in FIG. 1E, the processor 121 may communicate with various I/O devices 130 via the local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which at least one of the display devices 124 is a video display 124a, the processor 121 may use an Advanced Graphics Port (AGP) to communicate with the video display 124a. As illustrated in FIG. 1F, in some embodiments the main processor 121 of the computer 100 may communicate directly with I/O device 130b via HYPERTRANSPORT, RAPIDIO, or INFINIBAND communications technology. FIG. 1F also depicts an embodiment in which local busses and direct communication are mixed. For example, as illustrated in FIG. 1F, the processor 121 may communicate with I/O device 130a using a local interconnect bus while communicating with I/O device 130b directly.

A wide variety of I/O devices 130a-130n may be present in the computing device 100. Input devices, in some examples, may include keyboards, mice, trackpads, trackballs, microphones, and drawing tablets. Output devices, in some examples, may include video displays, speakers, inkjet printers, laser printers, and dye-sublimation printers. In some embodiments, the I/O controller 123, as shown in FIG. 1E, may control the I/O devices 130. The I/O controller 123 may control one or more I/O devices 130 such as the keyboard 126 and the pointing device 127, e.g., a mouse or optical pen. Furthermore, in some implementations, at least one of the I/O devices 130 may provide storage and/or an installation medium (e.g., such as the installation device 116) for the computing device 100. In still other embodiments, the computing device 100 may provide USB connections (not shown) to receive handheld USB storage devices such as the Universal Serial Bus (USB) Flash Drive line of devices manufactured by Twintech Industry, Inc. of Los Alamitos, Calif.

Referring again to FIG. 1E, the computing device 100 may support any suitable installation device 116, such as, in some examples, a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs. The computing device 100, in some embodiments, may further include the storage device 128, such as one or more hard disk drives or redundant arrays of independent disks, for storing the operating system 132 and other related software 134, and for storing application software programs such as any program related to the client agent 120. In some embodiments, any of the installation devices 116 could also be used as the storage device 128. Additionally, the operating system 132 and the software 134, in some implementations, may be run from a bootable medium, for example, a bootable CD, such as KNOPPIX, a bootable CD for GNU/Linux that is available as a GNU/Linux distribution from knoppix.net.

Furthermore, the computing device 100 may include, in some embodiments, the network interface 118 to interface to a network such as the network 104, described in relation to FIGS. 1A through 1D. In some implementations, the network interface 118 may interface with the network through a variety of connections including, but not limited to, standard telephone lines, LAN or WAN links (e.g., 802.11, Ti, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections, in some implementations, may be established between the network interface 118 and the network using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 may communicate with other computing devices via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118, in some examples, may include a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may include or be connected to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system 132 of the computing device 100 may be configured for using multiple displays 124a-124n. In other embodiments, one or more of the display devices 124a-124n may be provided by one or more other computing devices connected to the computing device 100, for example, via a network. These embodiments may include any type of software designed and constructed to use another computer's display device as a second display device for the computing device 100. One ordinarily skilled in the art will recognize and appreciate the various ways and embodiments that the computing device 100 may be configured to have multiple display devices 124a-124n.

In further embodiments, one of the I/O devices 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

The computing device 100 of the sort depicted in FIGS. 1E and 1F may typically operate under the control of the operating system 132, which controls scheduling of tasks and access to system resources. The computing device 100 can be running any operating system such as, in some examples, any of the versions of the Microsoft® Windows® operating systems, the different releases of the UNIX® and Linux™ operating systems, any version of the MAC OS for Macintosh computers, any embedded operating system, any real-time operating system, any open source operating system, any proprietary operating system, any operating systems for mobile computing devices, or any other operating system capable of running on the computing device 100 and performing the operations described herein. Typical operating systems include, but are not limited to: Windows® 3.x, Windows® 95, Windows® 98, Windows® 2000, Windows® NT 3.51, Windows® NT 4.0, Windows® 7, Windows® CE, Windows® XP, and Windows® VISTA, all of which are manufactured by Microsoft Corporation of Redmond, Wash.; MAC OS, manufactured by Apple Inc., of Cupertino, Calif.; OS/2, manufactured by International Business Machines of Armonk, N.Y.; and Linux, a freely-available operating system distributed by Caldera Corp. of Salt Lake City, Utah, or any type and/or form of a UNIX® operating system, among others.

The computing device 100, in some examples, can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computing device 100 may include a device of the IPOD family of devices manufactured by Apple Inc., of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

In some embodiments, the computing device 100 may have different processors, operating systems, and input devices consistent with the device 100. For example, in one embodiment, the computing device 100 may be a TREO 180, 270, 600, 650, 680, 700p, 700w/wx, 750, 755p, 800w, Centro, or Pro smart phone manufactured by Palm, Inc. In some of these embodiments, the TREO smart phone may be operated under the control of the PalmOS operating system and may include a stylus input device as well as a five-way navigator device.

In other embodiments the computing device 100 may be a mobile device, such as a Java™-enabled cellular telephone or personal digital assistant (PDA), such as the i55sr, i58sr, i85s, i88s, i90c, i95c1, i335, i365, i570, 1576, i580, i615, i760, i836, i850, i870, i880, i920, i930, ic502, ic602, ic902, i776 or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 may be a mobile device manufactured by Nokia of Finland, or by Sony Ericsson Mobile Communications AB of Lund, Sweden.

In still other embodiments, the computing device 100 may be a Blackberry handheld or smart phone, such as the devices manufactured by Research In Motion Limited, including the Blackberry 7100 series, 8700 series, 7700 series, 7200 series, the Blackberry 7520, the Blackberry PEARL 8100, the 8700 series, the 8800 series, the Blackberry Storm, Blackberry Bold, Blackberry Curve 8900, and the Blackberry Pearl Flip. In yet other embodiments, the computing device 100 may be a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 may be a digital audio player. In one of these embodiments, the computing device 100 may be a digital audio player such as the Apple IPOD, IPOD Touch, IPOD NANO, and IPOD SHUFFLE lines of devices, manufactured by Apple Inc., of Cupertino, Calif. In another of these embodiments, the digital audio player may function as both a portable media player and as a mass storage device. In other embodiments, the computing device 100 may be a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 may be a portable media player, such as the Zen Vision W, the Zen Vision series, the Zen Portable Media Center devices, or the Digital MP3 line of MP3 players, manufactured by Creative Technologies Ltd. In yet other embodiments, the computing device 100 may be a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4MPEG-4 (H.264/MPEG-4 AVC) video file formats.

In some embodiments, the computing device 100 may include a combination of devices, such as a mobile phone combined with a digital audio player or portable media player. In one of these embodiments, for example, the computing device 100 may be a Motorola RAZR or Motorola ROKR line of combination digital audio players and mobile phones. In another of these embodiments, the computing device 100 may be a device in the iPhone line of smartphones, manufactured by Apple Inc., of Cupertino, Calif.

In one embodiment, the computing device 100 may request resources from a remote computing device, while providing the functionality of a remote computing device to another computing device (e.g., client). In such an embodiment, the computing device 100 may be referred to as a client with respect to data received from the remote computing device (which may be referred to as a server) and the computing device 100 may be referred to as a server with respect to the remote computing device. In another embodiment, the computing device 100 may request resources from a remote computing device on behalf of a user of the computing device 100.

Any computing device, combination of computing devices, combination of networked computing devices, server, servers, or server farm, or combination thereof may be referred to as consisting of a particular computing entity.

C. Providing Security to File Storage Synchronization Programs

Figure 2A:
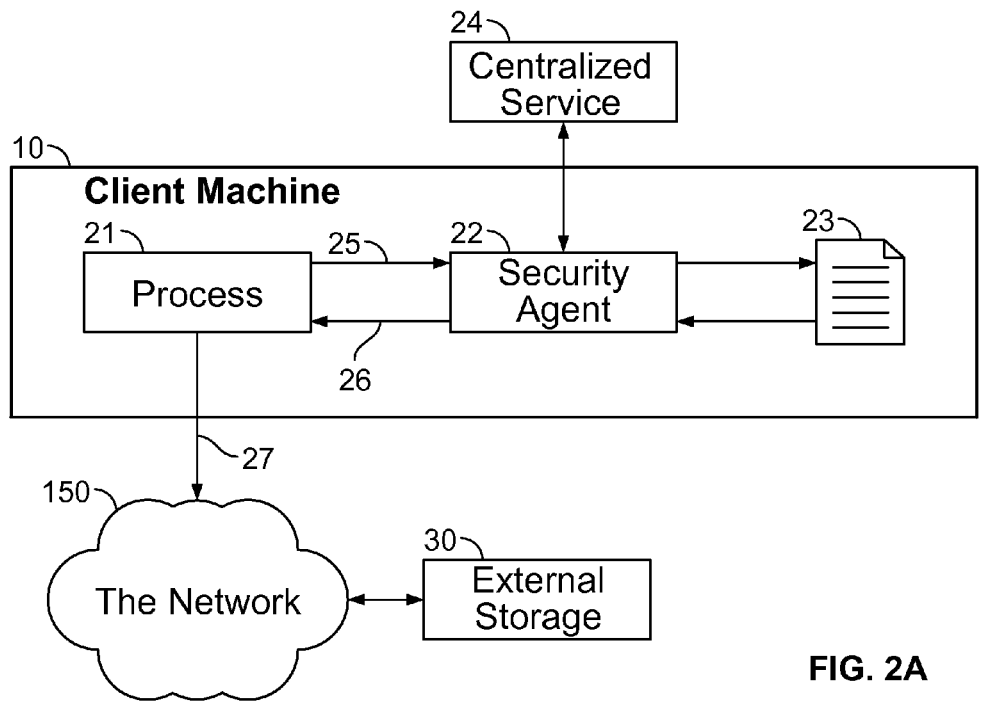
FIGS. 2A-2F are block diagrams depicting embodiments for secure handling of data transmitted to external storage providers.

Referring now to FIG. 2A, an embodiment of a system to secure handling of data accessed by a process is depicted. In brief overview, the client machine 10, in some embodiments, may include a process 21, a security agent 22, and a data file 23. The process 21, in some embodiments, may initiate a request 25 to access the data file 23. The security agent 22, in some embodiments, may intercept the request 25 and encrypt the data file 23. The security agent 22, in some embodiments, may then provide 26 the encrypted version of the data file 23 to process 21. Process 21, in some embodiments, may transmit 27 the encrypted version of the data file 23 to the network 150 for transmission to the external storage provider 30.

The data file 23 may be any data file capable of being stored on a computing system. Data file 23, in some examples, may be a text document, a compilation of data, a spreadsheet, an image, a movie file, a log file, or any other type of computer file. In one embodiment, data file 23 is unencrypted. In some embodiments, data file 23 may be an encrypted file.

In some embodiments, data file 23 may be a collection of files. Data file 23, for example, may be a representation of a directory which includes multiple files. Data file 23, in another example, may be an archive file that includes a number of files, such as a .zip archive file.

Data file 23, in some implementations, need not be stored on client machine 10, but may be stored in any location accessible to client machine 10. In some embodiments, data file 23 may be stored at a network location, an external hard drive, a CD-ROM, a floppy drive, a USB flash drive, or a Bluetooth® accessible device.

In one embodiment, the security agent 22 may be an independent application program running on the client machine 10. The security agent 22, in some embodiments, may be a sub-process of a larger application. The security agent 22, in some embodiments, may be in communication with a number of other components such as a centralized service 24, or a number of other databases, key stores, network monitoring equipment, or authentication servers.

In some embodiments, security agent 22 may not run on the client machine 10 but instead may run on a different computing device, for example a computing device connected to the client machine 10 over the network 150.

In some embodiments, the security agent 22 may operate as a listener process that awaits detection of a request for a file by process 21. The security agent 22, in some embodiments, may then trigger additional processes or sub-processes whether located on the client machine 10 or elsewhere on the network 150 to accomplish the functions of the security agent 22, including encryption.

In some embodiments, the security agent 22 may determine whether a particular program, process, application or user is "trusted" or "untrusted". That is, the security agent 22 may determine whether a particular program, process, application or user is allowed encryption-only access to the data file 23. A trusted process, for example, may be allowed full access to the data file 23 without encryption. An untrusted process, for example may be allowed encryption-only access to the data file 23.

The process 21 may be any process attempting access to file 23. Process 21, in some examples, may be an untrusted or trusted process. Process 21, in some examples, may be a stand-alone application running on the client machine 10, or it may be a component or sub-process of a larger process. Process 21, in some embodiments, may be a process provided by the external storage provider 30.

In one embodiment, the process 21 may be the client-side Dropbox™ application provided by Dropbox, Inc. of San Francisco, Calif. In some embodiments, process 21 may not be provided by the external storage provider 30. In other embodiments, process 21 may be the Outlook application provided by Microsoft Corporation of Redmond, Wash. In other embodiments, process 21 may be a client application provided by Dropbox, Inc. of San Francisco, Calif.; the Box-.net service provided by Box.net, Inc. of Palo Alto, Calif.; the SugarSync® service provided by Sugarsync, Inc. of San Mateo, Calif.; the Mozy® service provided by EMC Co. of Hopkinton, Mass.; the Carbonite® service provided by Carbonite, Inc. of Boston, Mass.; the ZumoDrive service provided by Zecter, Inc. of Burlingame, Calif.; the SkyDrive service provided by Microsoft Corp. of Redmond, Wash.; and the MobileMe service provided by Apple Inc. of Cupertino, Calif. In some embodiments, process 21 may be an application that is not provided by the external storage provider 30, but instead communicates with the external storage provider 30.

In one embodiment, process 21 may be a synchronization process which attempts to synchronize files accessible to the client machine 10 with files stored on the external storage provider 30.

In one embodiment, process 21 may run on the client machine 10. In some embodiments, process 21 may run on a different machine accessible by the client machine 10 via the network 150.

Figure 2B:
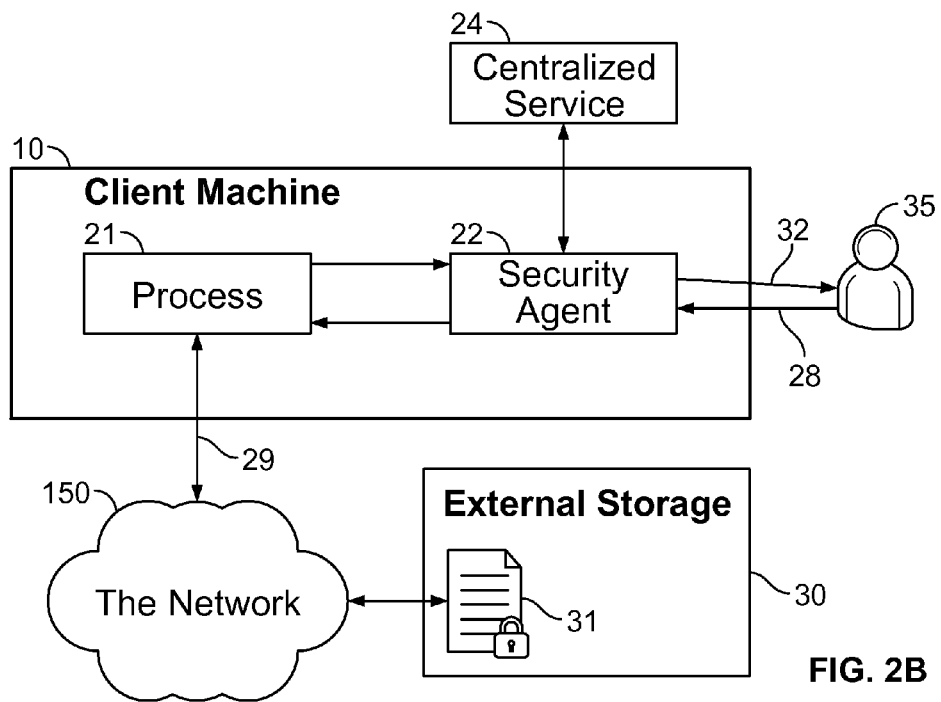

Referring now to FIG. 2B, an embodiment for accessing secured data stored by the external storage provider 30 is depicted. In brief overview, in some embodiments, a user 35 may initiate a request 28 for an encrypted file 31 stored by the external storage provider 30. The process 21, in some embodiments, may request 29 the encrypted file 31 from the external storage provider 30 on behalf of the user 35. Security agent 22, in some embodiments, may intercept the request 28 for encrypted file 31. Security agent 22, in some embodiments, may determine whether the user 35 is authorized to access the encrypted file 31, for example by consulting the centralized service 24. If authorized, security agent 22, in some embodiments, may decrypt the encrypted file 31 and provide 32 the decrypted version of the encrypted file 31 to the user 35.

In one embodiment, the centralized service 24 may be a process accessible by the client machine 10. For example, the centralized service 24 may be a process running on a server or other machine in the network 150. In some embodiments, the centralized service 24 may be a process running on the client machine 10. In other embodiments, the centralized service 24 may be a combination of processes running on both the client machine 10 and other machines on the network 150.

In some embodiments, the security agent 22 may make a determination as to whether an application, process, or machine is authorized to access the encrypted file 31 in consultation with the centralized service 24.

Figure 2C:
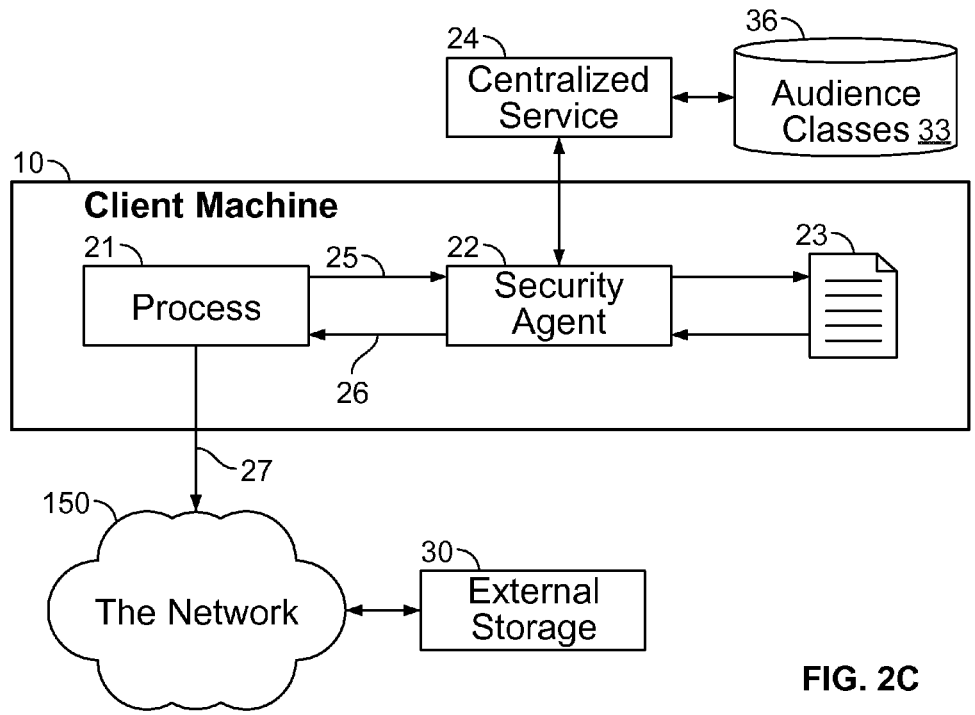

Referring now to FIG. 2C, an embodiment of a system to secure handling of data accessed by a process is depicted. In brief overview, process 21, in some embodiments, may make a request 25 to access data file 23. Security agent 22, in some embodiments, may intercept request 25. Security agent 22, in some embodiments, may be in communication with the centralized service 24 and a storage location 36 for audience class information 33. In some embodiments, security agent 22 may be in direct communication with the storage location 36. In other embodiments, security agent 22 may be in indirect or external (e.g., network) communication with the storage location 36. Security agent 22, in some implementations, may access the storage location 36 to obtain audience class information 33 related to data file 23. Security agent 22, in some embodiments, may assign an audience class to data file 23 and encrypt data file 23. Security agent 22, in some implementations, may provide 26 the encrypted version of the data file 23 to process 21 for transmission 27 to the external storage provider 30 via the network 150.

An audience class, in some implementations, may be any indicator of a group of users allowed to access particular files. Audience classes, in some implementations, may be mapped to the organizational structure of an entity running an enterprise network, such as an enterprise network including the client machine 10. In some implementations, audience classes may also be broken down according to specific jobs or roles in the organization, groups, geographic location, or by any other metric. For example, some audiences may be "Personal", "Executive Staff", "Company Wide", or "Public." In some implementations, audience classes may be groups of users maintained by one or more separate software applications, such as user groups maintained by Microsoft® Exchange Server provided by Microsoft, Inc. of Redmond, Wash. In some implementations, an audience class may be selected from a number of predetermined audience classes.

Figure 2D:
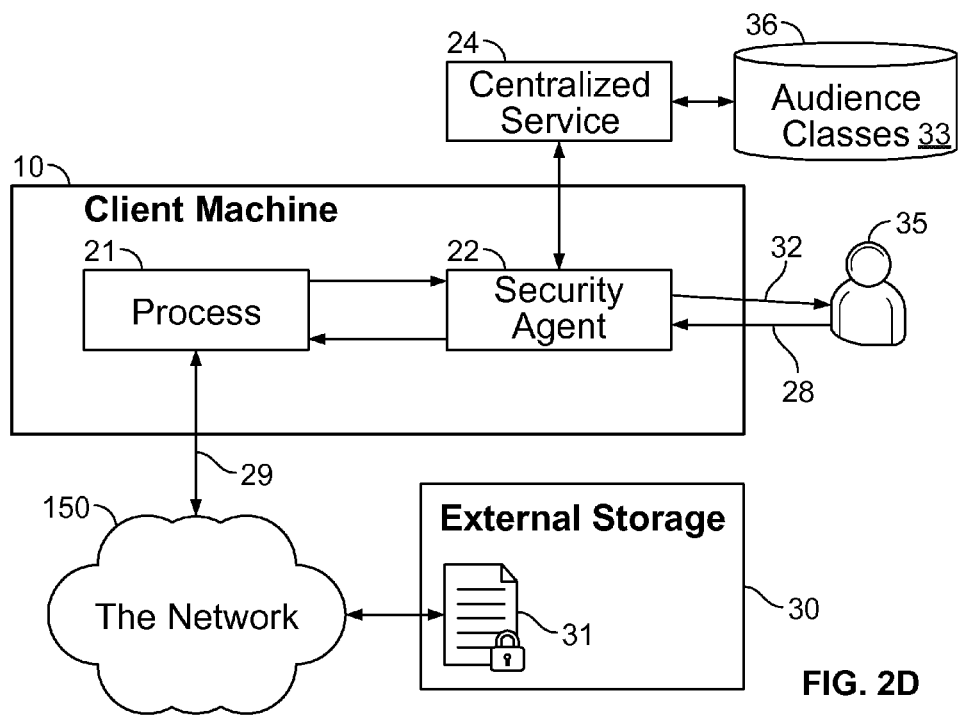

Referring now to FIG. 2D, an embodiment for accessing secured data stored by an external storage provider is depicted. The user 35, in some implementations, may initiate the request 32 for encrypted file 31 via process 21. Security agent 22, in some implementations, may intercept the request 32 and determine, in consultation with the centralized service 24 and audience class information 33, whether the user 35 belongs to the audience class assigned to the encrypted file 31. If the user 35 belongs to the assigned audience class, in some implementations, the encrypted file 31 may be decrypted and provided 32 to the user 35. In some implementations, the security agent 22 may decrypt the encrypted file 31. In other implementations, a process in communication with the external storage provider 30, for example via the network 150, may decrypt the encrypted file 31. In other implementations, a process in communication with the security agent 22, for example via the network 150 or within a same enterprise network as the client machine 10, may decrypt the encrypted file 31. For example, the external storage provider 30 may transmit 29 the encrypted file 31 across the network 150 to the client machine 10 or another machine in the same enterprise network as the client machine 10, and the encrypted file 31 may be decrypted within the enterprise network.

Figure 2E:
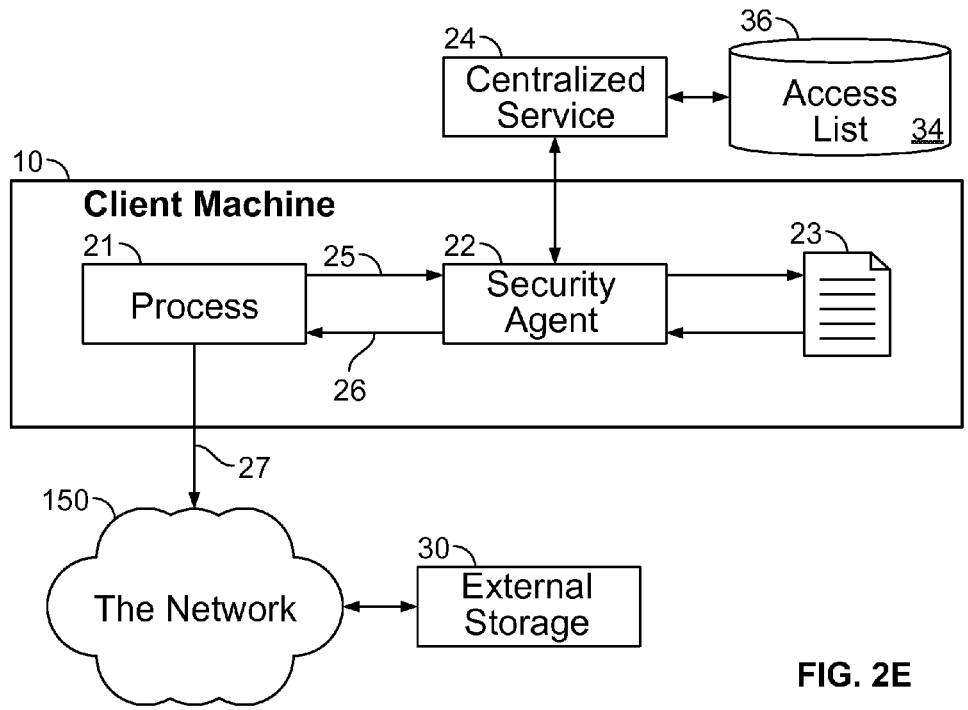

Referring now to FIG. 2E, an embodiment of a system to secure handling of data accessed by a process is depicted. In brief overview, in some implementations, security agent 22 may intercept a request 25 by a process 21 for data file 23. In some implementations, security agent 22 may add an identifier for data file 23 to an access list. The access list, in some implementations, may be stored in access list information 34 in the storage location 36. In some implementations, security agent 22 may directly communicate with storage location 36 to access the access list information 34. In other implementations, security agent 22 may negotiate with centralized service 24 to obtain a portion of the access list information 34 at the storage location 36. Security agent 22, in some implementations, may encrypt data file 23 and provide 26 the encrypted version of data file 23 to process 21 for transmission 27 over the network 150 to the external storage provider 30.

Figure 2F:
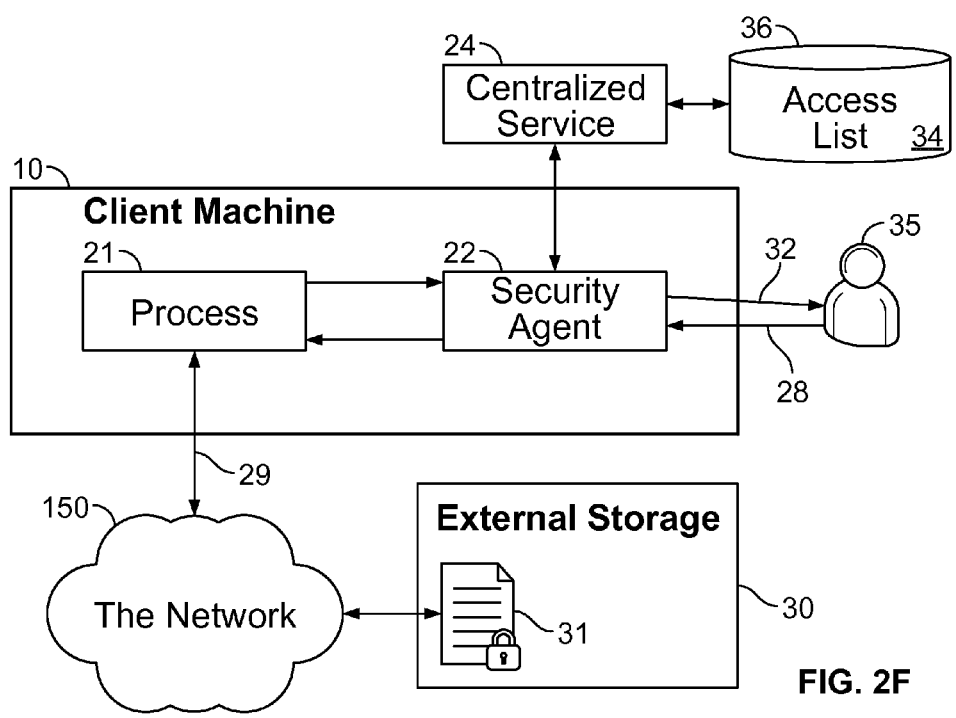

Referring now to FIG. 2F, an embodiment for accessing secured data stored by an external storage provider is depicted. In some implementations, the user 35 may initiate the request 28 for the encrypted file 31 stored by the external storage network 30 via process 21. The security agent 22, in some implementations, may intercept the request 28 and determine by consulting access list information 34 at the storage location 36 whether the user 35 is authorized to access encrypted file 31. If the user 35 is authorized, in some implementations, the security agent 22 may decrypt the encrypted file 31 and provide 32 the decrypted version of the encrypted file 31 to the user 35.

Although the various embodiments described in relation to FIGS. 2B, 2D, and 2F describe authorization in relation to the user 35, in some implementations, the security agent 22 may determine whether to fulfill the request 28 for the encrypted data file 31 based upon the request originating from a recognized company, organization, enterprise network, LAN, MAN, or other recognizable entity. In some examples, an entity may be recognized by network address (e.g., internet protocol address or media access control (MAC) address, etc.) or network address range, machine security identifier (SID), or other unique identifier. In some implementations, a user or entity may provide a unique identifier with the request 28, and the security agent 22 may authorize the user or entity based in part upon recognition of the unique identifier. The unique identifier, in some examples, may include a MAC address, network session identifier, email address, user identifier and password, or unique security code. In some implementations, the unique identifier may be provided to the security agent 22 as encrypted information.

Figure 3A:
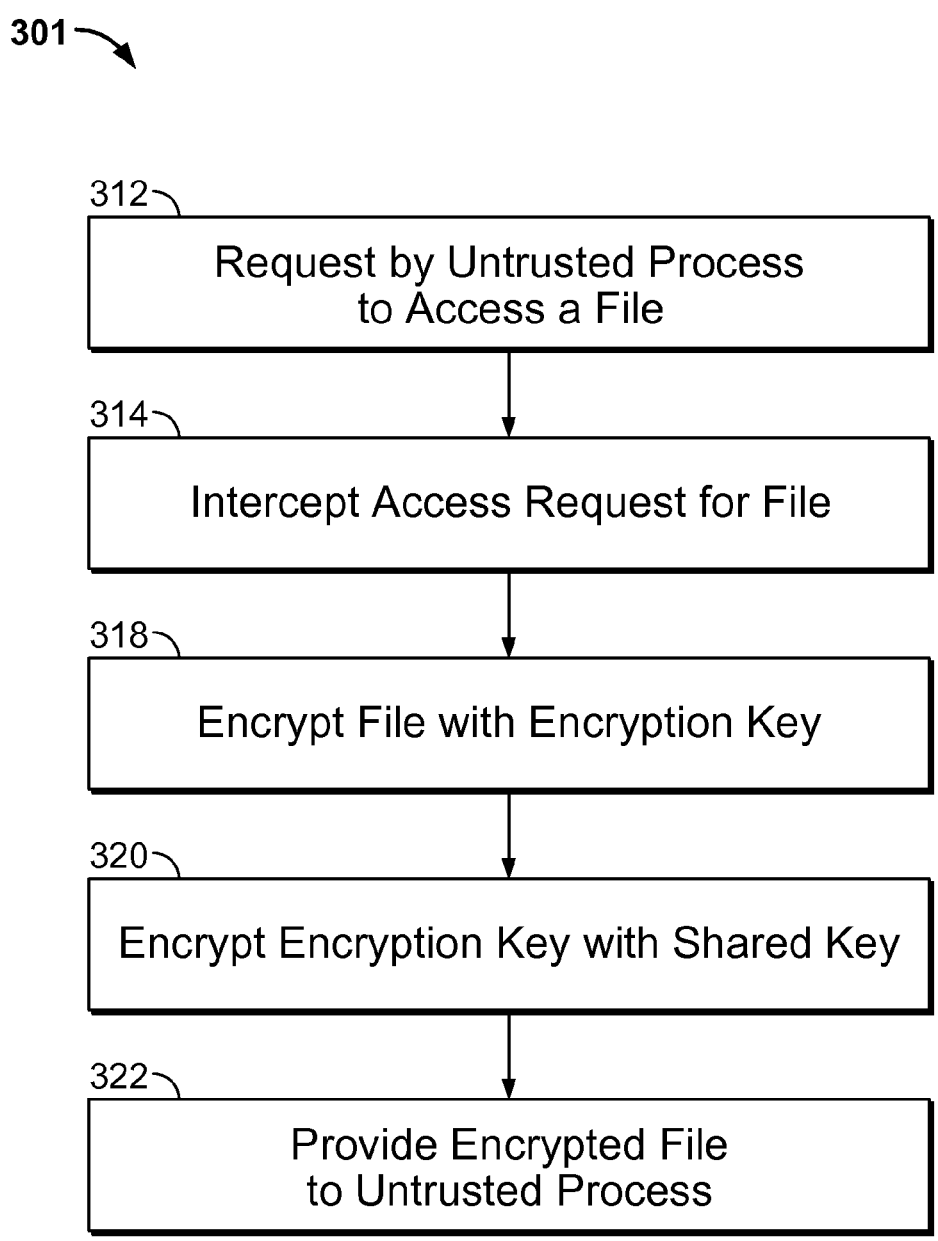
FIGS. 3A-3B are flow diagrams depicting embodiments of methods for securing data prior to transmission.

Referring now to FIG. 3A, an embodiment of a method 301 for secure handling of data accessed by an untrusted process is depicted. The method 301, in some implementations, may be performed by a security agent process or application. The security agent 22, for example as described in relation to FIGS. 2A through 2F, may perform one or more steps of the method 301.

In some implementations, the method 301 may begin with receiving a request to access a file (312). In some implementations, the request may be submitted by an untrusted or unknown process, or on behalf of an untrusted or unknown requestor. In some embodiments, the request may be made by a semi-trusted process. For example, the request may originate from a trusted entity, but the individual computing device or user originating the request may be treated with suspicion prior to authentication or verification. In other embodiments, a request 25 by an untrusted process to access a file may be made on behalf of a user, or on behalf of another process or application. The request, in some examples, may be a local request to a client computing device performing the method 301, a request between two client computing devices on an enterprise network, or a request initiated by a computing device beyond the enterprise network where the method 301 is performed. The request, for example, may be made over the Internet. In some embodiments, the request may be made on a predetermined schedule or according to a synchronization protocol.

In some embodiments, the file being requested may reside on a computing device locally accessible to the computing device performing the method 301. For example, the file may be stored in storage media included within or directly connected to the computing device performing the method 301. In some embodiments, the file may be stored on a server in the enterprise network, or the file may be stored on a server external to the enterprise network. The file, in some implementations, may be stored on a computing device connected to the client machine over the Internet. The file, in some implementations, may be stored in "the Cloud."

The request to access the file, in some implementations, may be intercepted (314). In some implementations, a security agent, such as the security agent 22 described in relation to FIGS. 2A through 2F, may intercept the request to access the file. In some embodiments, a security agent may intercept the request by operating as a listener process that waits for and responds to a request being made. In some embodiments, intercepting the request may be accomplished by routing all network traffic through an intermediary network appliance. The intercepting, in some examples, can occur at the client computing device, on some other computing device in the enterprise network, on two or more computing devices in the enterprise network, or on two or more computing devices connected over the Internet.

In some implementations, the file may be encrypted with an encryption key (318). In some embodiments, a security agent process such as the security agent 22, described in relation to FIGS. 2A through 2F, may encrypt the file with an encryption key. In some implementations, a unique encryption key may be generated for the file being encrypted. In some embodiments, the encryption key may be managed by a separate process or application, such as the centralized service 24 described in relation to FIGS. 2A through 2F. In other embodiments, encryption keys may be stored on a machine in the same enterprise network as the computing device performing the method 301. For example, encryption keys may be made available to the security agent process from a local or remote computing device managing the encryption keys. In some implementations, the security agent may consult a remotely located key store or key engine in order to generate a unique key for the file. In some embodiments, the encryption keys may be managed by a centralized service, such as the centralized service 24 described in relation to FIGS. 2A through 2F. In some implementations, one or more encryption keys may be relayed from the centralized service 24 to the security agent 22, for example upon demand by the security agent 22.

In some implementations, encryption of the file may be managed by the computing device performing the process 301, while one or more encryption algorithms may be applied to the file on some other computing device in the enterprise network, on two or more computing devices in the enterprise network, or on one or more computing devices connected to the computing device performing the method 301. For example, one or more encryption algorithms may be applied to the file on a second computing device accessible via the Internet from the computing device performing the method 301.

In some implementations, the encryption key may be encrypted with a shared key (320). In some embodiments, a security agent such as the security agent 22 described in relation to FIGS. 2A through 2F may encrypt the encryption key with a shared key by using a shared key available to all users of the enterprise network. In some embodiments, the shared key may be managed by a separate process or computing device, such as the centralized service 24 described in relation to FIGS. 2A through 2F. In some embodiments, the shared key may be a private key. In other embodiments, the shared key may be a public key. In some embodiments, the shared key may be a key known to a particular set of users or particular set of applications or processes. In some embodiments, the shared key may be generally known to trusted processes on the enterprise network. The encryption of the encryption key, in some implementations, may occur at the computing device performing the method 301. In other implementations, encryption of the encryption key may occur in part on some other computing device in the enterprise network, on two or more computing devices in the enterprise network, or on one or more computing devices connected to the computing device performing the method 301. For example, encryption of the encryption key may occur in part on a computing device connected via the Internet to the computing device performing the method 301.

In some implementations, the encrypted file may be provided to the requestor (322). In some embodiments, the encrypted file may be provided to the requestor by sending the encrypted file from one process to another on a same client machine. In other embodiments, the file may be provided to the requestor over the local enterprise network or over the Internet. Rather than sending the file itself to the requestor, in some implementations, an identifier of the file may be provided to the requestor. In some implementations, the identifier may identify a location at which the file is available.

Figure 3B:
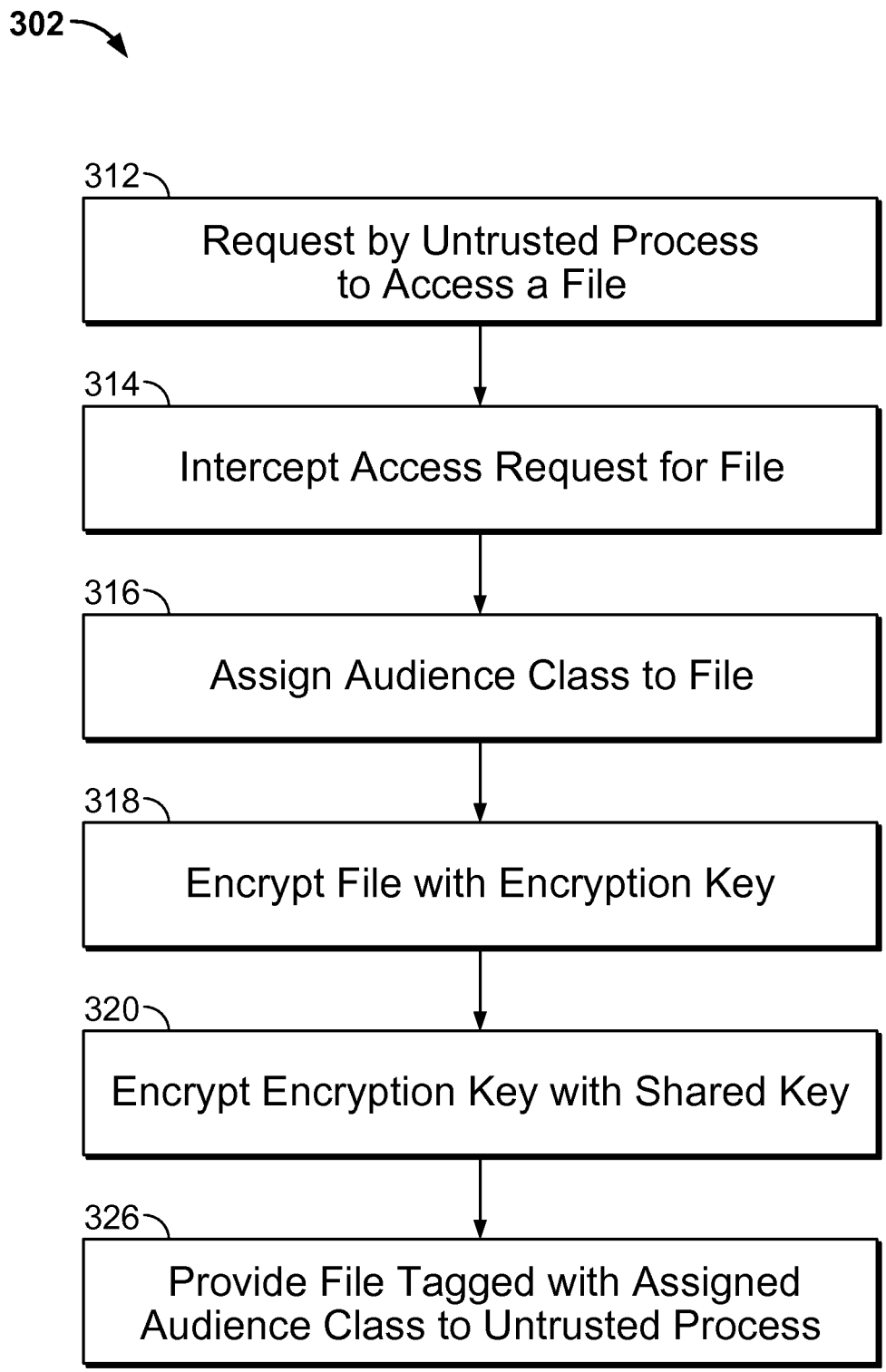

Referring now to FIG. 3B, an embodiment of a method 302 for secure handling of data accessed by an untrusted process is depicted. The method 302, in some implementations, may be performed by a security agent process or application. In some embodiments, the security agent 22, for example as described in relation to FIGS. 2A through 2F, may perform one or more steps of the method 302. As the method 302 shares many of the same steps as the method 301 described in relation to FIG. 3A, only the steps not described in relation to FIG. 3A are described in detail below.

In some implementations, the method 302 may begin with receiving a request to access a file (312). The request to access the file, in some implementations, may be intercepted (314).

An audience class, in some embodiments, may be assigned to the file (316). In some implementations, a security agent process such as the security agent 22 described in relation to FIGS. 2A through 2F may assign the audience class to the file. In some implementations, two or more audience classes may apply to the same file. For example, both an audience class of "manager" and an audience class of "human resources" may be assigned to a particular file. In some implementations, the audience class may be derived based upon file information. For example, a file identifier or other file metadata may be used to determine an audience class to assign to the file.

In some implementations, information regarding one or more audience classes may be held in a storage device local to the computing device performing the method 302. For example, audience class information may be stored in a memory of the computing device performing the method 302 or in a storage media directly connected to the computing device performing the method 302. In other implementations, a storage media containing audience class information may be accessible to the computing device performing the method 302 via a local network, enterprise network, or the Internet. In some implementations, a separate process, such as a centralized service, may be referenced to determine the audience class for the file. The separate process, for example, may be the centralized service 24 described in relation to FIGS. 2A through 2F.

In some implementations, the file may be encrypted with an encryption key (318). In some implementations, the encryption key may be encrypted with a shared key (320). The encrypted file tagged with the assigned audience class, in some implementations, may be provided to the requestor (326). For example, the file may be tagged with the assigned audience class by including an indication of the audience class within file metadata. In some implementations, an audience class identifier may be provided separately from the encrypted file, for example within a network response protocol header or an additional network protocol response communication. As described in relation to step 322 of method 301, described in relation to FIG. 3A, in some embodiments, the encrypted file may be provided to the requestor by sending the encrypted file from one process to another on a same client machine. In other embodiments, the file may be provided to the requestor over the local enterprise network or over the Internet. Rather than sending the file itself to the requestor, in some implementations, an identifier of the file may be provided to the requestor.

Figure 3C:
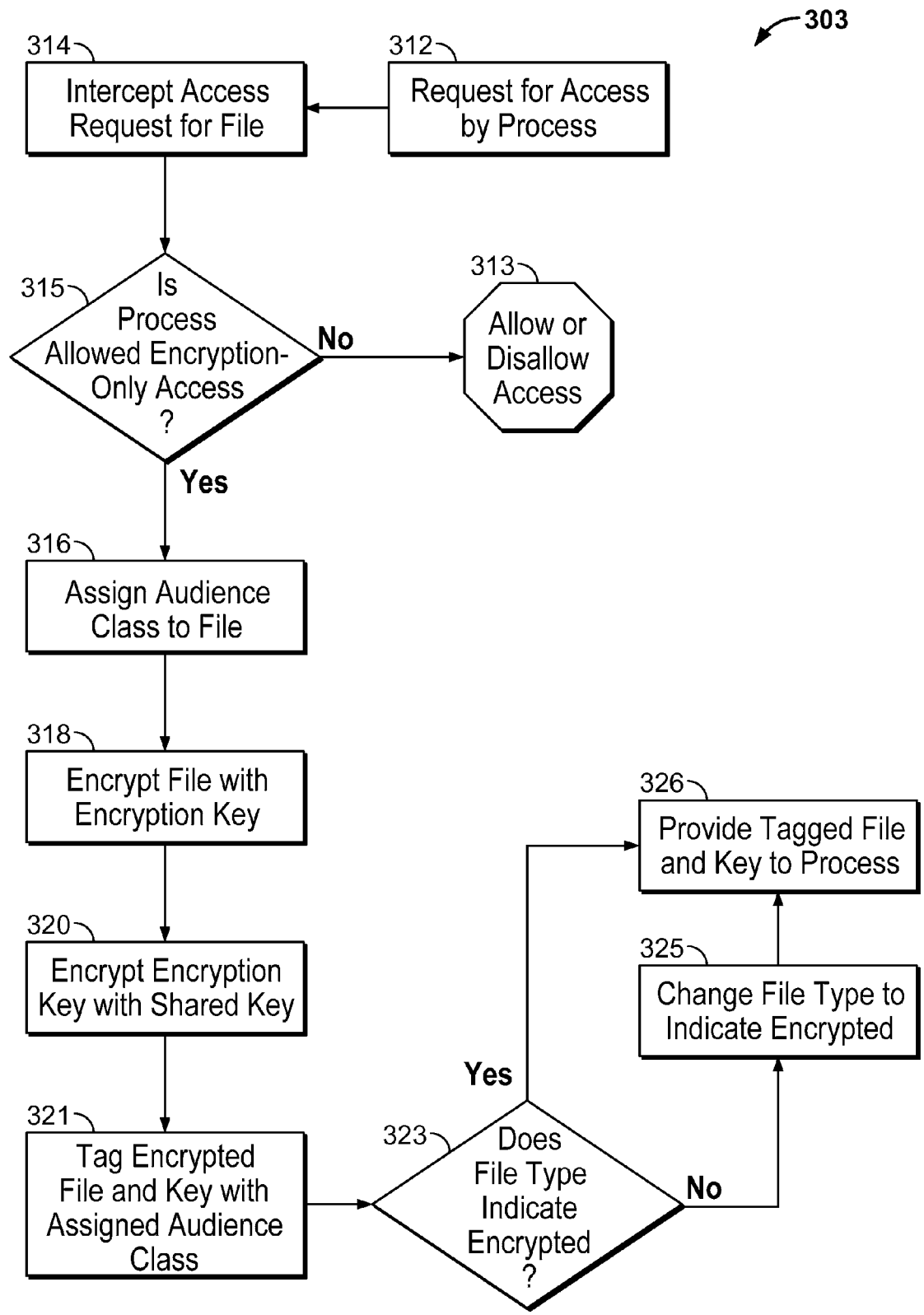
FIGS. 3C-3D are process diagrams depicting embodiments of methods for securing data before transmission by a process.

Referring now to FIG. 3C, an embodiment of a method 303 for secure handling of data accessed by an untrusted process is depicted. The method 303, in some implementations, may be performed by a security agent process or application. The security agent 22, for example as described in relation to FIGS. 2A through 2F, may perform one or more steps of the method 303. As the method 303 shares many of the same steps as the methods 301 and 302 described in relation to FIGS. 3A and 3B, only the steps not described in relation to FIGS. 3A and 3B are described in detail below.

In some implementations, the method 303 may begin with receiving a request to access a file (312). The request to access the file, in some implementations, may be intercepted (314). In some implementations, a determination is made as to whether the requestor is limited to encryption-only access (315). In some implementations, requestors may either be allowed to proceed with encrypted access to the requested file, or be denied any access to the requested file. In other implementations, a determination may be made as to whether (a) a requestor has encryption-free access (e.g., allow without encryption), (b) the file is to undergo encryption prior to access, or (c) the requestor is to be denied access. If the requestor is determined to have encryption-only access, in some implementations, an audience class may be assigned to the file (316). In some implementations, the file may be encrypted with an encryption key (318). In some implementations, the encryption key may be encrypted with a shared key (320).

In some implementations, the encrypted file and/or the encrypted encryption key may be tagged with the assigned audience class (321). A security agent process, such as the security agent 22 described in relation to FIGS. 2A through 2F, may, in some implementations, tag the encrypted file and/or the encrypted encryption key with the assigned audience class.

In some implementations, it may be determined whether the current file type of the encrypted file indicates that the file is an encrypted file (323). For example, a file extension or file metadata may be indicative of an encrypted file type.

If the file type does not indicate that the file is encrypted, in some implementations, the file type may be changed to one that is indicative that the file is encrypted (325). For example, the file extension on the file may be changed to a file extension that is indicative that the file is encrypted.

If, instead, the file type is already indicative that the file is encrypted, in some implementations, the encrypted file tagged with the assigned audience class may be provided to the requestor (326).

Figure 3D:
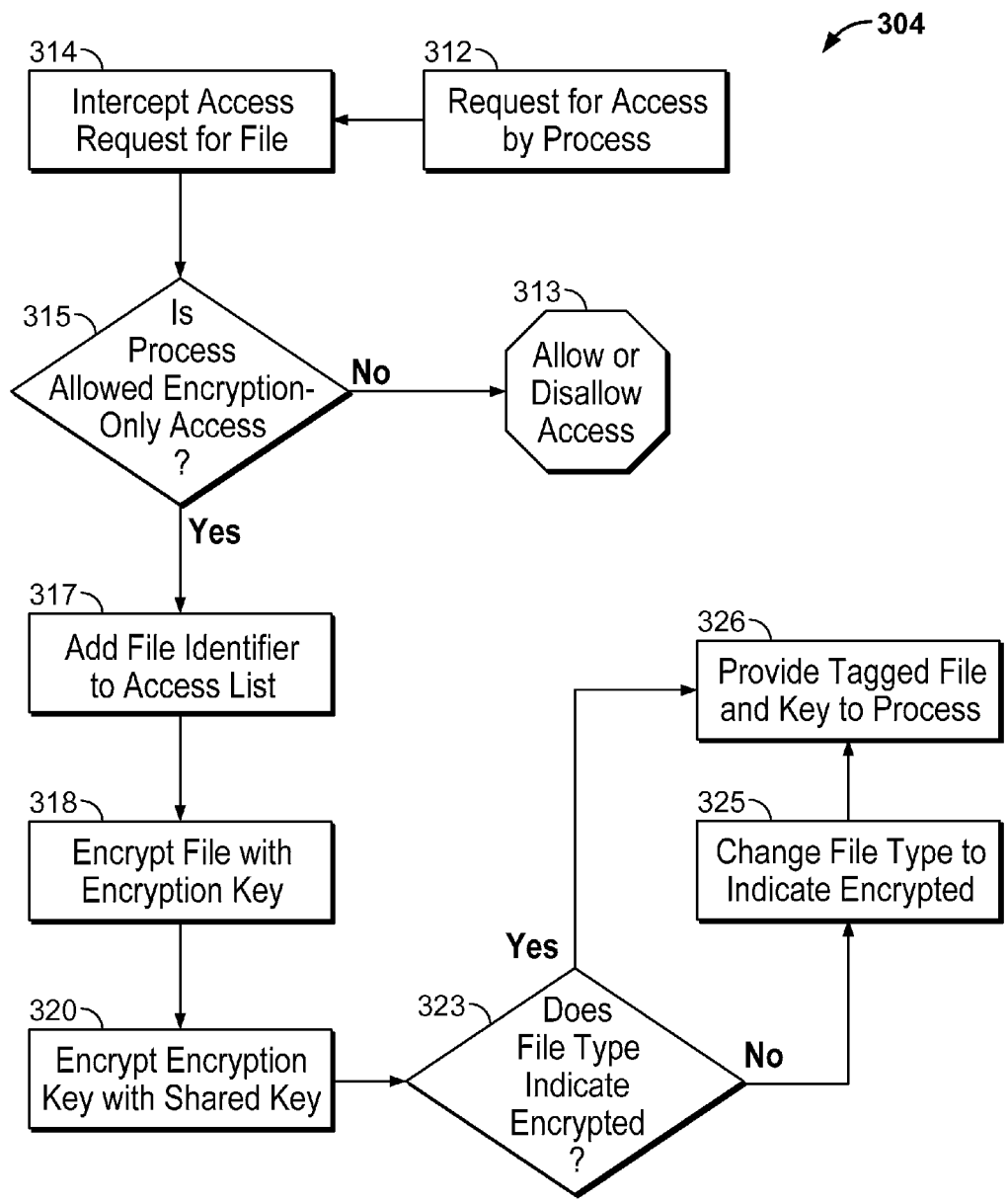

Referring now to FIG. 3D, an embodiment of a method 304 for secure handling of data accessed by an untrusted process is depicted. The method 304, in some implementations, may be performed by a security agent process or application. The security agent 22, for example as described in relation to FIGS. 2A through 2F, may perform one or more steps of the method 304. As the method 304 shares many of the same steps as the methods 301, 302 and 303 described in relation to FIGS. 3A through 3C, only the steps not described in relation to FIGS. 3A through 3C are described in detail below.

In some implementations, the method 304 may begin with receiving a request to access a file (312). The request to access the file, in some implementations, may be intercepted (314). In some implementations, a determination may be made as to whether the requestor is limited encryption-only access (315).

If the requestor is limited to encryption-only access, in some implementations, an identifier for the file may be added to an access list (317). For example, the security agent 22 may add an identifier for the file to an access list maintained in a storage media. In some implementations, the storage media may be in direct communication with the computing device performing the method 304. For example, the access list may be maintained in a memory of the computing device or in a storage media directly connected to the computing device adding the identifier to the access list. In other implementations, the access list may be maintained in a storage media remotely located from the computing device performing the method 304. In some examples, the access list may be accessible to the computing device performing the method 304 via a local network, enterprise network, or the Internet. In some implementations, a separate process may maintain the access list. For example, the security agent 22, described in relation to FIGS. 2A through 2F, may negotiate with the centralized service 24, described in relation to FIGS. 2A through 2F, to update the access list with the file identifier.

In some implementations, the file may be encrypted with an encryption key (318). In some implementations, the encryption key may be encrypted with a shared key (320).

In some implementations, it may be determined whether the current file type of encrypted file indicates that the file is an encrypted file (323). If the file type does not indicate that the file is encrypted, in some implementations, the file type may be changed to one that is indicative that the file is encrypted (325). In some implementations, the encrypted file tagged with the assigned audience class may be provided to the requestor (326).

Figure 4A:
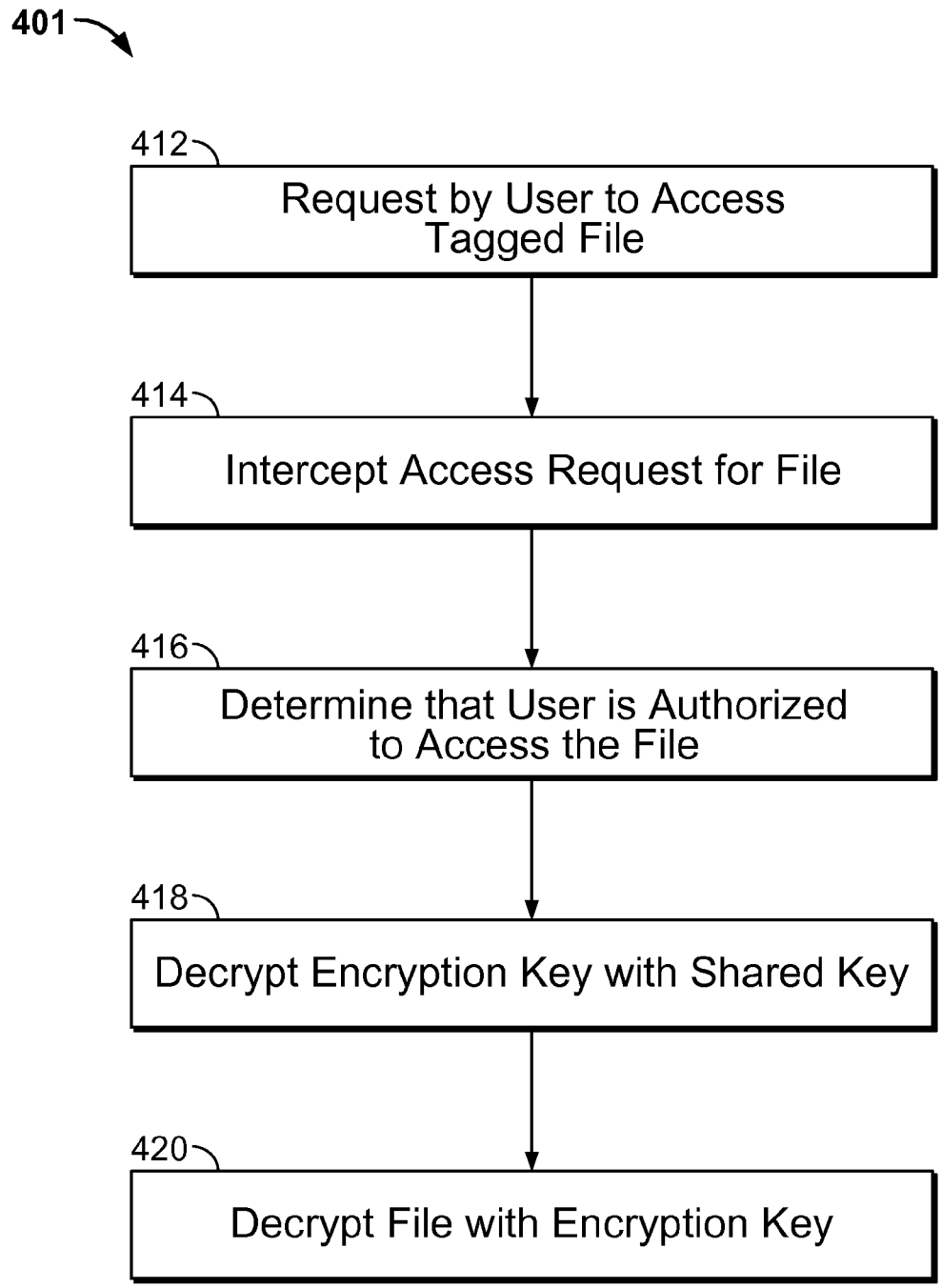
FIGS. 4A-4B are flow diagrams depicting embodiments of methods for retrieving secured data from external storage providers.

Referring now to FIG. 4A, an embodiment of a method 401 for accessing secured data stored by an external storage provider is depicted. The method 401, in some implementations, may be performed by a security agent process or application. The security agent 22, for example as described in relation to FIGS. 2A through 2F, may perform one or more steps of the method 401. In some implementations, the method 401 may be used to provide secure access to data stored by the external storage provider 30, as described in relation to FIGS. 2A through 2F.

In some implementations, the method 401 may begin with receiving a request to access a tagged file (412). In some implementations, the request may be submitted by an untrusted or unknown process, or on behalf of an untrusted or unknown requestor. In some embodiments, the request may be made by a semi-trusted process. For example, the request may originate from a trusted entity, but the individual computing device or user originating the request may be treated with suspicion prior to authentication or verification. In other embodiments a request by an untrusted process to access a file may be made on behalf of a user, or on behalf of another process or application. The request, in some examples, may be a local request to a client computing device performing the method 401, a request between two client computing devices on an enterprise network, or a request initiated by a computing device beyond the enterprise network where the method 401 is performed. The request, for example, may be made over the Internet. In some embodiments, the request may be made on a predetermined schedule or according to a synchronization protocol.

In some embodiments, the file being requested may reside on a computing device locally accessible to the computing device performing the method 401. For example, the file may be stored in storage media included within or directly connected to the computing device performing the method 401. In some embodiments, the file may be stored on a server in the enterprise network, or the file may be stored on a server external to the enterprise network. The file, in some implementations, may be stored on a computing machine connected to the client machine over the Internet. The file, in some implementations, may be stored in "the Cloud." In some implementations, the file may be tagged with an assigned audience class by including an indication of the audience class within file metadata. In some implementations, an audience class identifier may be stored separately from the file, for example as metadata associated with a storage location or available in a file identifier look-up. For example, a hash table mechanism may be used to match a file identifier with an audience class tag.

The request to access the file, in some implementations, may be intercepted (414). In some implementations, a security agent such as the security agent 22 described in relation to FIGS. 2A through 2F may intercept the request to access the file. In some embodiments, a security agent may intercept the request by operating as a listener process that waits for and responds to a request being made. In some embodiments, intercepting the request may be accomplished by routing all network traffic through an intermediary network appliance. The intercepting, in some examples, can occur at the client computing device, on some other computing device in the enterprise network, on two or more computing devices in the enterprise network, or on two or more computing devices connected over the Internet.

In some implementations, user authorization to access the file may be determined (416). In some embodiments, user authorization may involve determining whether a particular application or process is authorized to access the file. In some embodiments, an audience class database may be accessed to obtain information regarding groups of users with differing levels of access to files. In some embodiments, an access list may be accessed to obtain associations between users or groups of users and varying access levels to files. In some embodiments, a centralized service such as the centralized service 24, described in relation to FIGS. 2A through 2F, may be consulted to obtain information regarding access lists and/or audience classes. In some embodiments, the computing device performing the method 401 may be in direct communication with an audience class database or an access list. For example, the audience class database or access list may be maintained in a storage medium within direct (e.g., wired) or networked access of the computing device performing the method 401. In some embodiments, the computing device performing the method 401 may have a portion of the resources available locally (e.g., access list information, audience class database) to determine whether a particular user, application, or process has authorization to access a particular file. For example, the computing device performing the method 401 may store access list information within an internal or directly connected memory region.

In some implementations, the encryption key may be decrypted using a shared key (418). In some implementations, the file may be encrypted using an encryption key, and the encryption key may, in turn, be encrypted using a shared key. For example, the method 302 described in relation to FIG. 3B includes steps towards encrypting a file with an encryption key (318) and encrypting the encryption key using a shared key (320). In some embodiments, a security agent such as the security agent 22 (e.g., described in relation to FIGS. 2A through 2F) may decrypt the encryption key stored with the file using a shared key. One or more decryption algorithms, in some implementations, may be provided on the computing device performing the method 401. In other embodiments, one or more decryption operations may be accomplished over the enterprise network or over the Internet.

In some embodiments, the shared key may be a private key. In some embodiments, the shared key may be a public key. In some embodiments, the shared key may be managed by a centralized service such as the centralized service 24 described in relation to FIGS. 2A through 2F. In some embodiments, the computing device performing the method 401 may communicate with a centralized service or other process, database, or resource, to determine which key, from a number of available keys, to use in decrypting the encrypted encryption key. The encryption key, in some implementations may be a unique key generated for the particular encrypted file. The encryption key, in some implementations, may be managed by a centralized service or stored in a key store. In some implementations, the computing device performing the method 401 may be in direct communication with the key store. In other implementations, the computing device performing the method 401 may be in communication with the key store via a centralized service.

The file, in some embodiments, may be decrypted using the encryption key (420). In some embodiments, a security agent such as the security agent 22 described in relation to FIGS. 2A through 2F may decrypt the file using the encryption key. One or more decryption algorithms, in some implementations, may be provided on the computing device performing the method 401. In other embodiments, one or more decryption operations may be accomplished over the enterprise network or over the Internet.

Figure 4B:
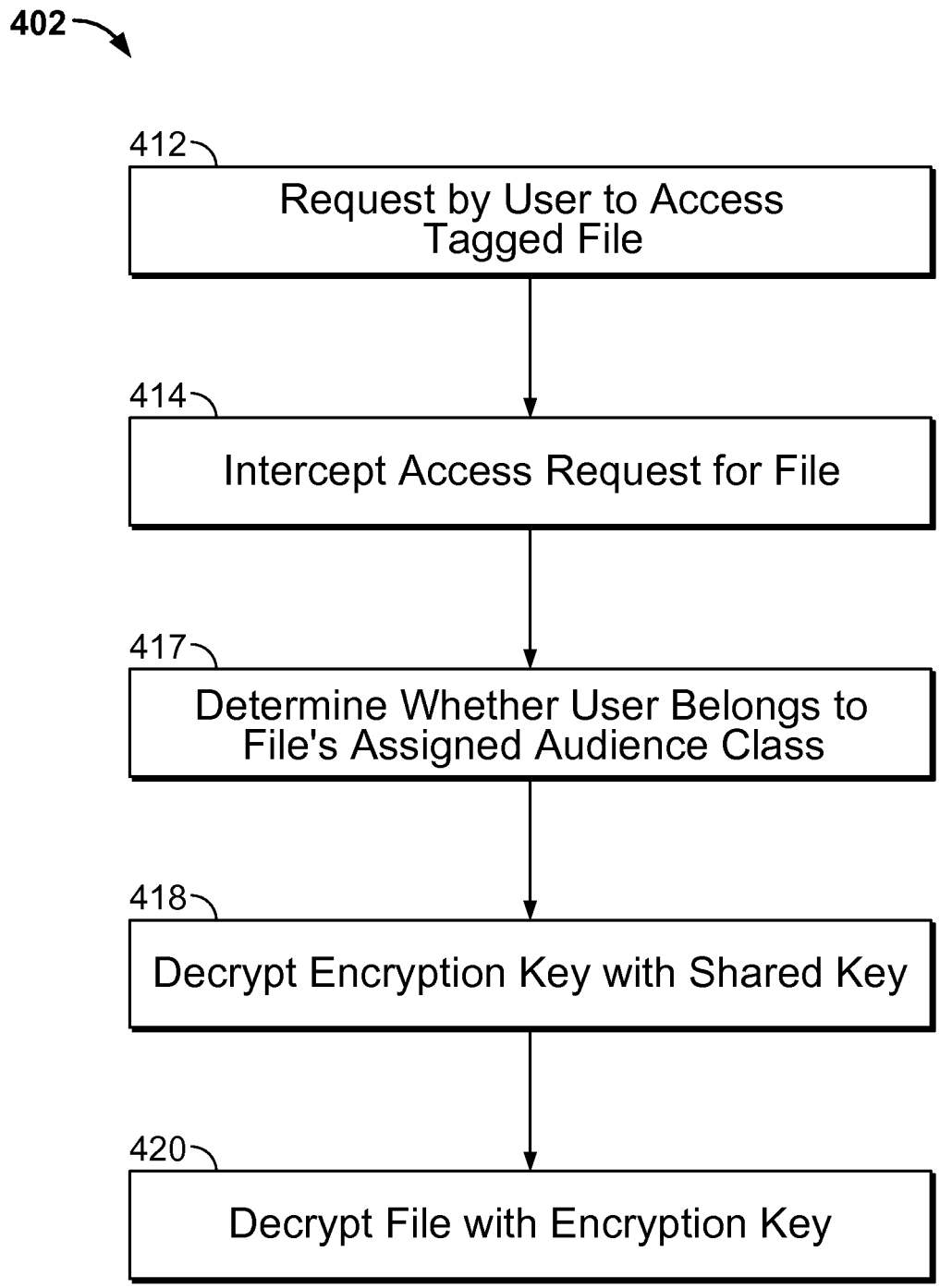

Referring now to FIG. 4B, an embodiment of a method 402 for accessing secured data stored by an external storage provider is depicted. The method 402, in some implementations, may be performed by a security agent process or application. The security agent 22, for example as described in relation to FIGS. 2A through 2F, may perform one or more steps of the method 402. As the method 402 shares many of the same steps as the method 401 described in relation to FIG. 4A, only the steps not described in relation to FIG. 4A are described in detail below.

In some implementations, the method 402 may begin with receiving a request to access a tagged file (412). The request to access the file, in some implementations, may be intercepted (414).

In some implementations, it may be determined whether the requestor belongs to the audience class assigned to the requested tagged file (417). In some implementations, audience class information may be accessed to determine whether the requestor belongs to the audience class identified in the tag of the requested file. The audience class information, in some implementations, may be maintained in a local storage media or in a remote storage media directly accessible to the computing device performing the method 402. In other implementations, audience class information may be accessed from a separate computing device. For example, the centralized service 24, as described in relation to FIGS. 2A through 2F, may access audience class information 33, and provide information as to whether the requestor belongs to the audience class assigned to the tagged file.

In some implementations, the encryption key may be decrypted using a shared key (418). The file may be decrypted using the encryption key (420).

Figure 4C:
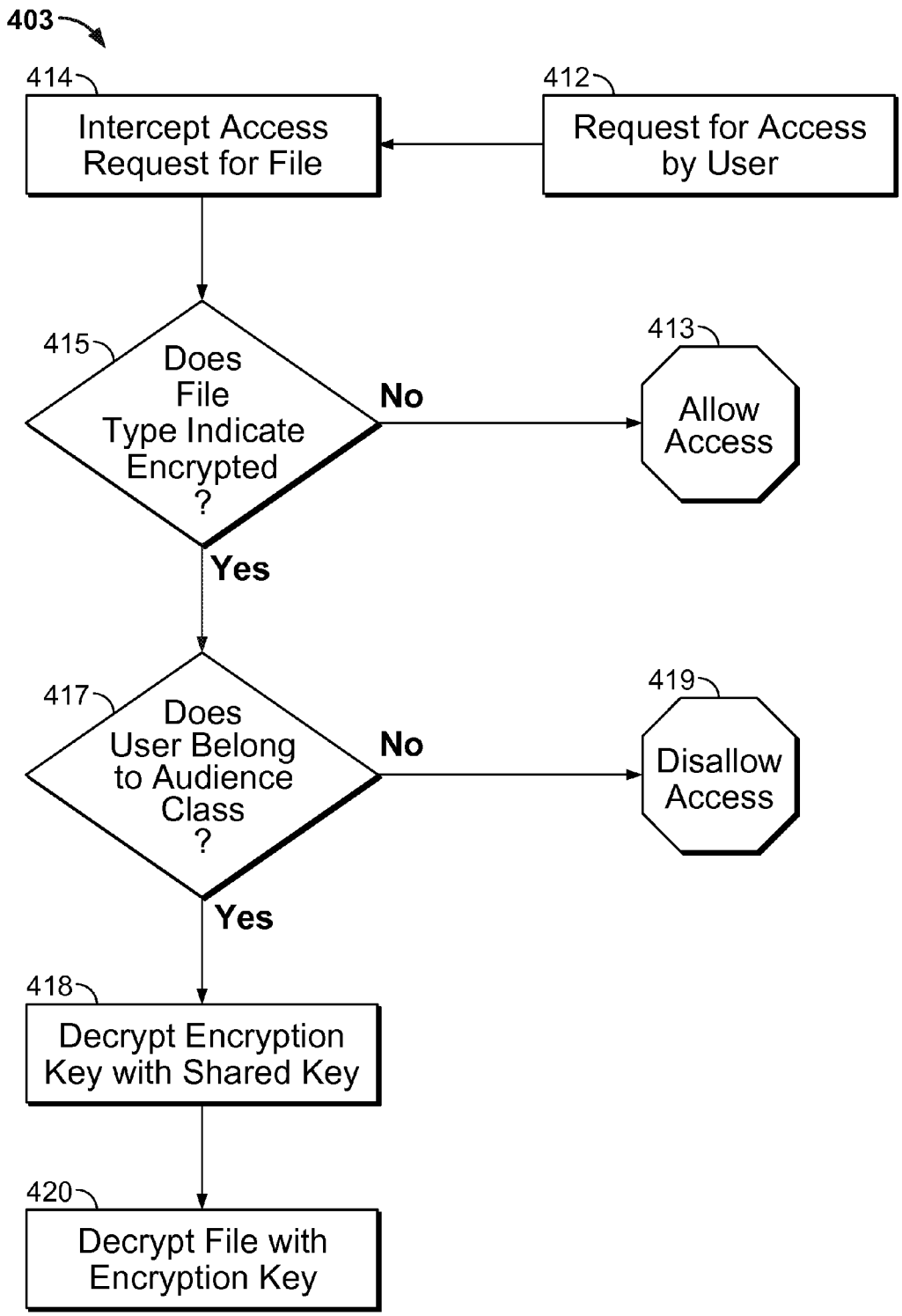
FIGS. 4C-4D are process diagrams depicting embodiments of methods for retrieving secured data from external storage providers.

Referring now to FIG. 4C, an embodiment of a method 403 for accessing secured data stored by an external storage provider is depicted. The method 403, in some implementations, may be performed by a security agent process or application. The security agent 22, for example as described in relation to FIGS. 2A through 2F, may perform one or more steps of the method 403. As the method 403 shares many of the same steps as the method 401 described in relation to FIG. 4A and the method 402 described in relation to FIG. 4B, only the steps not described in relation to FIGS. 4A and 4B are described in detail below.

In some implementations, the method 403 may begin with receiving a request to access a tagged file (412). The request to access the file, in some implementations, may be intercepted (414).

In some implementations, it may be determined whether the file type indicates that the file is an encrypted file (415). If the file type does not indicate that the file is encrypted, the requestor may or may not be allowed access (413). For example, if a requestor is associated with a trusted enterprise or entity, the requestor may be provided access to the file. Conversely, if the requestor is affiliated with an untrusted enterprise or entity, or if the requestor is otherwise not recognized, the requestor may be disallowed access to the file.

If the file type instead indicates that the file is encrypted (415), in some implementations, a determination may be made as to whether the requestor belongs to the audience class assigned to the requested tagged file (417). If the requestor is determined to not belong to the audience class assigned to the file (417), in some implementations, access by the user may be disallowed (419). In some embodiments, it may be possible to change the membership of a particular audience class in between the process of encrypting and transmitting a file to the external storage provider and subsequently retrieving the file from the external storage provider. It may then be possible, in some embodiments, that a user that transmitted a file to the external storage provider may later find himself or herself unable to access the file, for example because he or she may have been removed from the audience class allowed to access the file.

If, conversely, it is determined that the requestor does belong to the audience class assigned to the file (417), in some implementations, the encryption key may be decrypted using a shared key (418). The file may be decrypted using the encryption key (420).

Figure 4D:
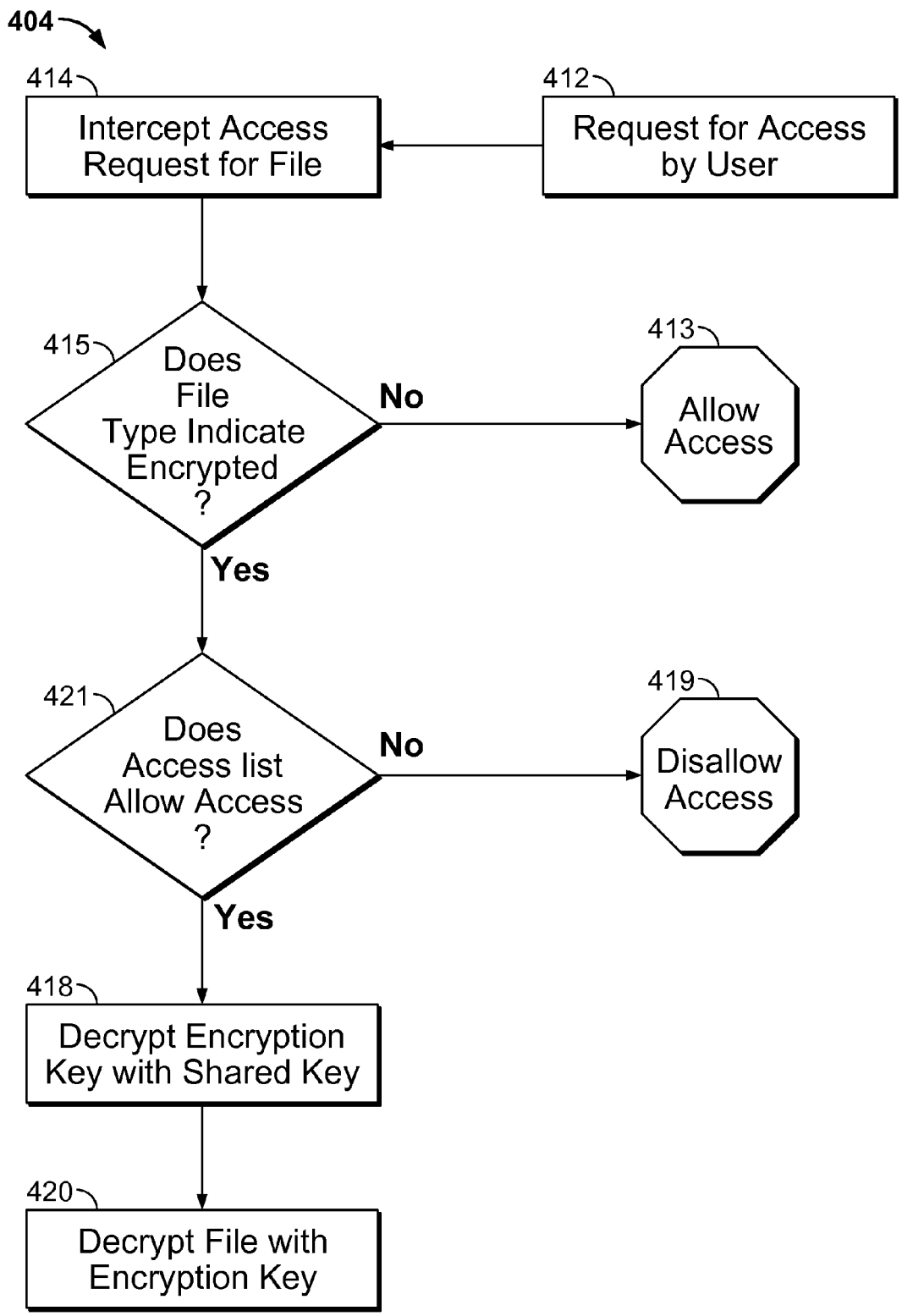

Referring now to FIG. 4D, an embodiment of a method 404 for accessing secured data stored by an external storage provider is depicted. The method 404, in some implementations, may be performed by a security agent process or application. The security agent 22, for example as described in relation to FIGS. 2A through 2F, may perform one or more steps of the method 404. As the method 404 shares many of the same steps as the method 401 described in relation to FIG. 4A, the method 402 described in relation to FIG. 4B, and the method 403 described in relation to FIG. 4C, only the steps not described in relation to FIGS. 4A through 4C are described in detail below.

In some implementations, the method 404 may begin with receiving a request to access a tagged file (412). The request to access the file, in some implementations, may be intercepted (414). In some implementations, it may be determined whether the file type indicates that the file is an encrypted file (415). If the file type does not indicate that the file is encrypted, the requestor may or may not be allowed access (413).

If the file type instead indicates that the file is encrypted (415), in some implementations, a determination may be made as to whether the requestor is authorized to access the file by consulting an access list (421). In some embodiments, the access list may be indexed according to an identifier for the file. The access list may, in some implementations, include a list of users or groups of users associated with that file who are allowed access. The access list may, in some implementations, include a list of users or group of users that are explicitly denied access to a file.

If it is determined that the requestor is not authorized to access the file (421), in some implementations, access by the user may be disallowed (419). In some embodiments, it may be possible to change the access list in between the process of encrypting and transmitting a file to the external storage provider and subsequently retrieving the file. It may then be possible, in some implementations, that a user that transmitted a file to the external storage provider may be unable at a later time to access the file. For example, a user may have been removed from the list of allowed users associated with a particular file identifier on the access list.

If, conversely, it is determined that the requestor does belong to the access list assigned to the file (421), in some implementations, the encryption key may be decrypted using a shared key (418). In some implementations, the file may be decrypted using the encryption key (420).

Figure 5A:
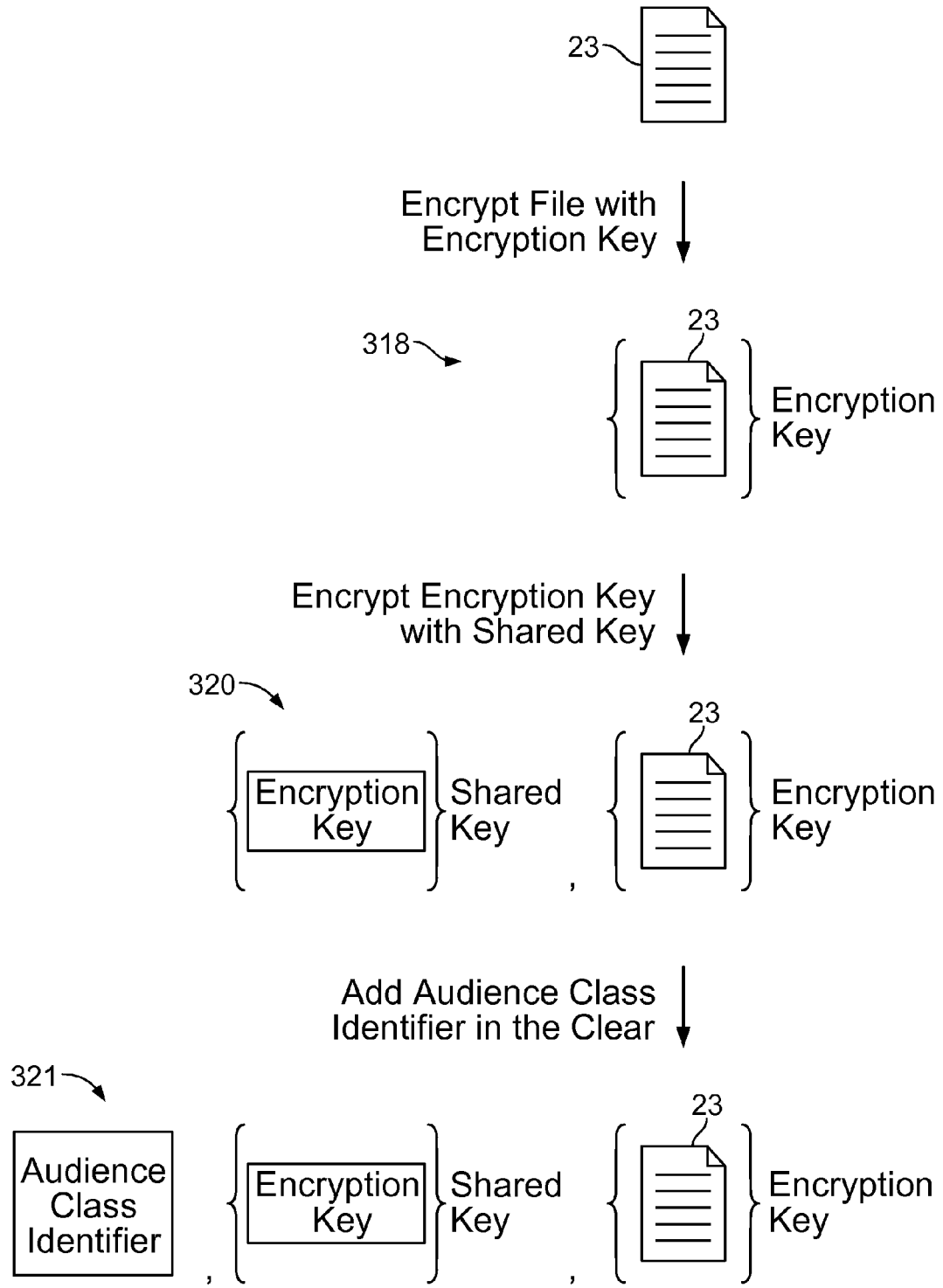
FIG. 5A is a process diagram depicting an embodiment of an encryption process.

Referring now to FIG. 5A, an embodiment of an encryption process is depicted. The encryption process begins with data file 23. Data file 23, in some embodiments, may be encrypted with an encryption key (318). In some embodiments, the encryption key may be a uniquely generated key for data file 23. The encryption key, in some embodiments, may then be encrypted with a shared key and grouped with the file encrypted with the encryption key (320). In some implementations, an unencrypted audience class identifier associated with data file 23 may be grouped together, or "tagged," with the encrypted encryption key and encrypted file (321). The audience class identifier may be added in the clear, or it may be hashed before addition in a manner capable of interpretation to the security agent.

In some embodiments, data file 23 may itself be an encrypted file prior to the application of the process depicted in FIG. 5A.

In some embodiments, tagging with the audience class identifier may be accomplished by adding the audience class identifier to the encrypted file's metadata.

Figure 5B:
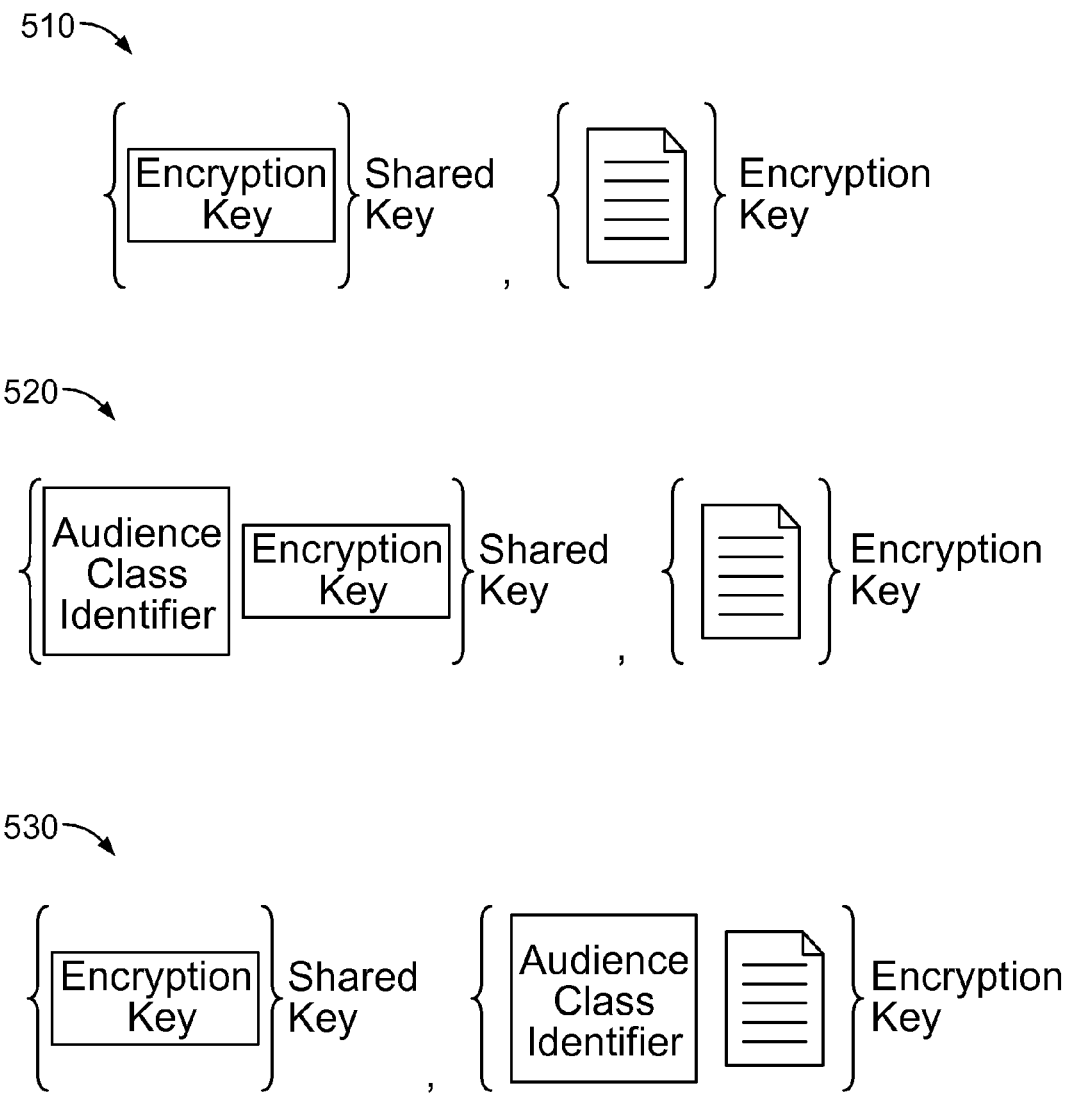
FIG. 5B is a process diagram depicting various embodiments of encrypted data.

Referring now to FIG. 5B, various embodiments of encrypted files and keys are depicted. In the first depiction (510), the encrypted file does not include an audience class identifier and includes the encrypted file and encrypted encryption key. In the second depiction (520), the audience class identifier has also been encrypted with the shared key along with the encryption key. In the third depiction (530) the audience class identifier has been encrypted along with the file. A person of ordinary skill in the art would understand that the systems and methods disclosed could use any one of these encryption schemes, as well as any combination thereof. Furthermore, many other plausible encryption schemes known in the art are contemplated by the present disclosure.

Figure 6A:
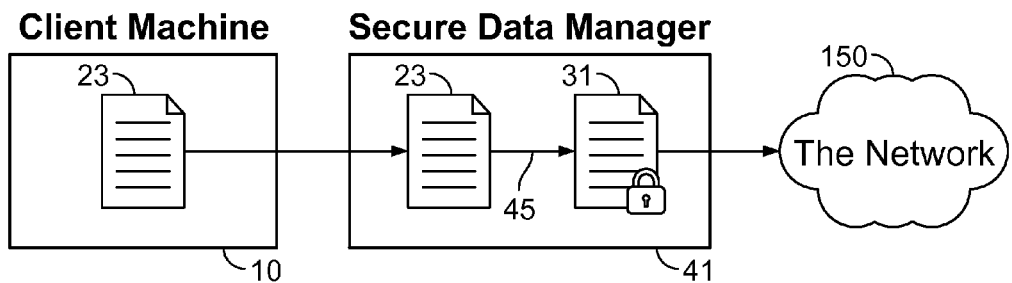
FIGS. 6A-6C are process diagrams depicting encryption and decryption processes.

D. Systems and Methods for Providing Security to File Storage by an External Storage Provider Referring now to FIG. 6A, an embodiment of a system for securing a file for transmission to an external storage provider is depicted. In brief overview, the data file 23 may be accessible by the client machine 10. An attempt to transmit the data file 23 through the network 150 to the machines of an external storage provider, in some implementations, may be made. A secure data manager 41, in some implementations, may detect the transmission and encrypt 45 the data file 23 into the encrypted file 31. The secure data manager 41, in some implementations, may then transmit the encrypted file 31 to the external storage provider (not illustrated) via the network 150.

In one embodiment, the secure data manager 41 may run on a computing device positioned at the edge of an enterprise network, such as intermediary machine 18 described in relation to FIGS. 1B and 1C. In other embodiments, the secure data manager 41 may run on a client machine or any other machines on the enterprise network. The secure data manager 41 may also run as a combination of processes on a number of servers, machines, intermediaries, and clients. In some embodiments, the secure data manager 41 may also be referred to as a security component or security agent.

In some embodiments, the encryption 45 performed by the secure data manager 41 may be considered "on-the-fly" encryption or "real-time" encryption in that a file may be immediately decrypted after encryption. In some embodiments, on-the-fly encryption may be implemented through use of the TrueCrypt open source program by the TrueCrypt Foundation.

Figure 6B:
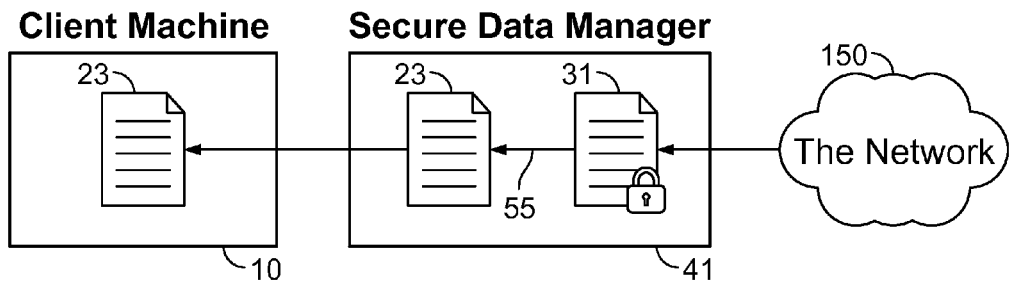

Referring now to FIG. 6B, an embodiment of a system for accessing secured files from an external storage provider is depicted. A request may be made, in some embodiments, to access an encrypted file 31 stored by the external storage provider 41. The request, in some implementations, may be issued across the network 150. The secure data manager 41, in some implementations, may intercept the request and decrypt 55 encrypted file 31 into unencrypted data file 23. The secure data manager 41, in some implementations, may transmit data file 23 to the client machine 10.

In some embodiments, the secure data manager 41 may determine whether a particular user, process, or entity attempting to access the encrypted file 31 is authorized to access the encrypted file 31. The secure data manager 41, in some implementations, may also determine whether a particular application is authorized to access the encrypted file 31.

In one embodiment, the secure data manager 41 may assign a location for mounting a virtual disk volume (not illustrated) including a copy or representation of the stored encrypted file 31. The virtual disk volume may be provided by the secure data manager 41 or an external storage provider (not illustrated). The virtual disk volume, in some implementations, may be a network directory linked to the location of stored files at the external storage provider. The virtual disk volume, in some implementations, may be an application or process that provides access to the external storage provider's storage location.

In some embodiments, a representation of the encrypted file 31 stored by the external storage provider on the virtual disk volume may be a link, icon, screenshot, image, virtual copy, or any other representation or identifier which enables access to the encrypted file 31 stored by the external storage provider. A representation may, in some implementations, include an abridged preview copy of the entire encrypted file 31. A representation of the encrypted file 31, in some implementations, may also include a directory, directory identifier, or part of a directory.

In some embodiments, a copy of the encrypted file stored at the virtual disk volume may be a local copy made and maintained by the secure data manager. A local copy on the virtual disk drive may also be made and maintained by the external storage provider. It may be desirable to maintain local copies on the virtual disk volume for the purposes of synchronization, particularly where the external storage provider is being used as a backup service provider.

Figure 6C:
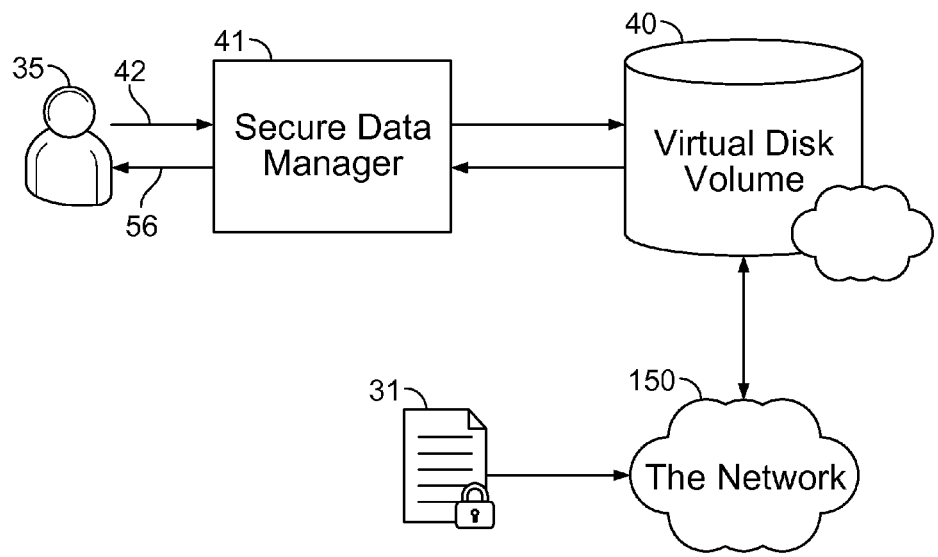

Referring now to FIG. 6C, an embodiment of a system for accessing secured files from an external storage provider on behalf of a user is depicted. In brief overview, the user 35 authorized to access a location may, in some implementations, initiate a request 42 to a virtual disk volume 40 that has been mounted at the location for the encrypted file 31 stored by an external storage provider (not illustrated). The secure data manager 41, in some implementations, may intercept the request 42 and decrypt encrypted file 31. The secure data manager 41 may then provide 56 the decrypted version of the encrypted file 31 to the user 35.

In some embodiments, the secure data manager 41 may determine whether a particular user attempting to access a particular location on virtual disk volume 40 is authorized to access the location. The secure data manager, in some implementations, may determine whether a particular application is authorized to access a particular location on virtual disk volume 40.

In some embodiments, the location at which to mount the virtual disk volume 40 is a network mount location. The location at which to mount the virtual disk volume 40, in some embodiments, may also be a secure network mount location.

Figure 7:
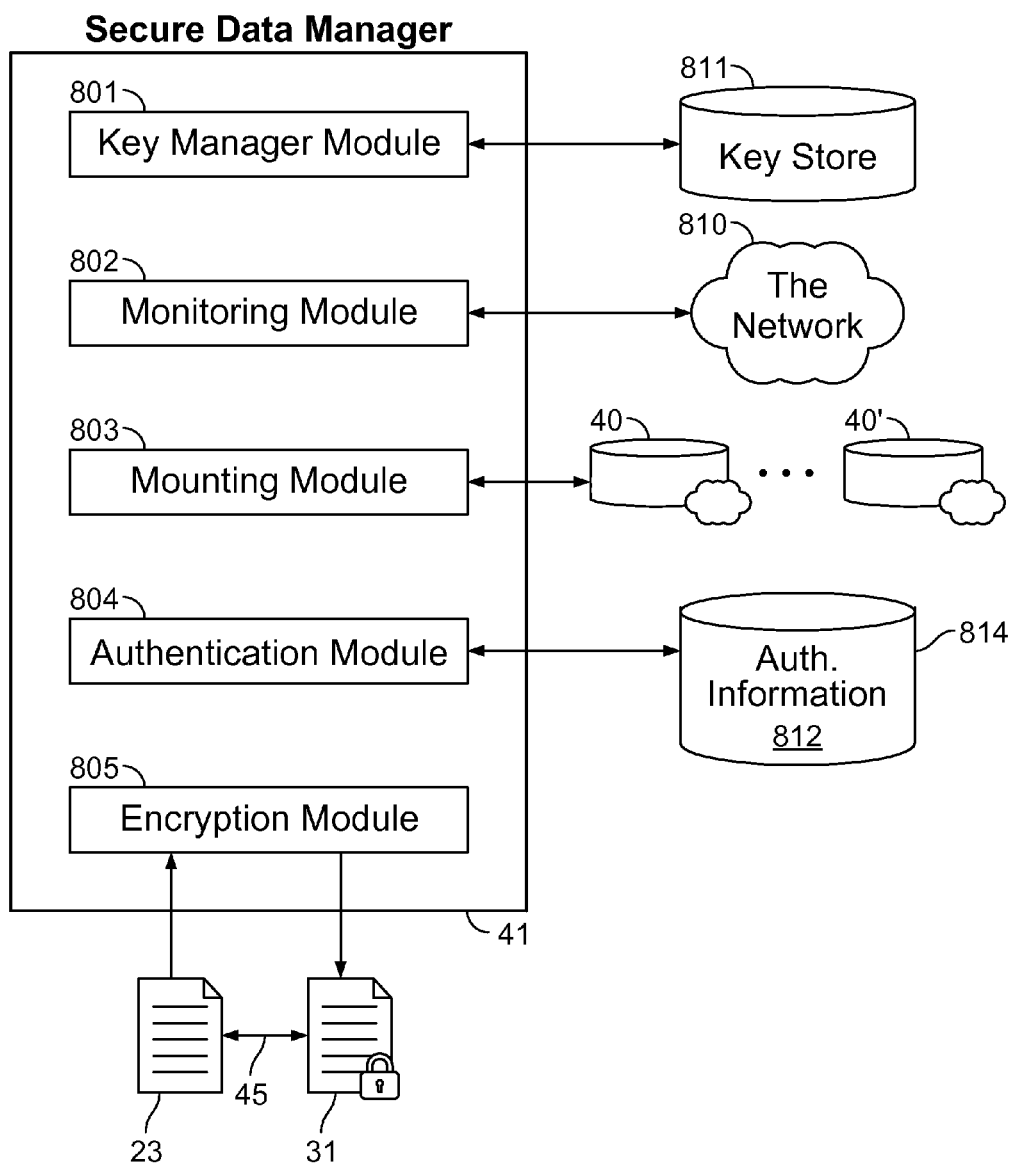
FIG. 7 is a block diagram depicting an embodiment of a secure data manager for providing security to file storage by an external storage provider.

Referring now to FIG. 7, an embodiment of a secure data manager is depicted. In some embodiments, the secure data manager 41 may include a Key Manager Module 801, a Monitoring Module 802, a Mounting Module 803, an Authentication Module 804, and an Encryption Module 805. The Key Manager Module 801, in some embodiments, may operate in communication with a Key Store 811. In some embodiments, the Monitoring Module 802 may operate in communication with an enterprise network 810. The Mounting Module 803, in some embodiments, may operate in communication with virtual disk volumes 40, 40', 40" (which may be collectively referred to herein as virtual disk volumes 40) that are mounted at various locations on the enterprise network 810. The Authentication Module 804, in some implementations, may operate in communication with a storage location for Authentication Information 812. The Encryption Module 805, in some implementations, may operate in communication with unencrypted data files and encrypted data files, such as unencrypted data file 23 and encrypted file 31.

In one embodiment, each module 801, 802, 803, 804, and 805 of secure data manager 41 may run on a computing device at the edge of the enterprise network 810, such as intermediary machine 18 described in relation to FIGS. 1B and 1C. In other embodiments, secure data manager 41 may run as a single process or as multiple processes on either a single machine or on two or more machines.

In some embodiments, each module 801, 802, 803, 804, and 805 of the secure data manager 41 may run as a single process or as multiple processes on either a single machine or a number of machines.

In one embodiment, the Key Manager Module 801 may be responsible for assigning and keeping track of encryption keys used by the secure data manager 41.

In some embodiments, Key Manager Module 801 may operate in communication with a Key Generation unit, which may generate encryption keys with which to encrypt files.

In one embodiment, the Monitoring Module 802 may be responsible for monitoring the enterprise network 810, as well as the usage of the secure data manager 41. The Monitoring Module 802, in some implementations, may track the usage of the secure data manager 41 and may generate reports and information on usage of the secure data manager 41 and the enterprise network 810.

In some embodiments, the Monitoring Module 802 may operate in communication with an Auditing System (not illustrated). The Auditing System may be used for the purposes of conducting audits and compliance checks.

In one embodiment, the Mounting Module 803 may be responsible for assigning locations for virtual disk volumes 40. The Mounting Module 803 may operate in communication with the Authentication Module 804, in some implementations, in order to determine whether particular users or applications are authorized to use various locations on the virtual disk volumes 40. In some embodiments, the Mounting Module 803 may generate new locations for virtual disk volumes 40.

In one embodiment, the Authentication Module 804 may be responsible for authenticating whether a particular user or application is authorized to access a given location on a particular virtual disk volume 40. The Authentication Module 804, in some implementations, may operate in communication with a database 814 providing authentication information 812. The authentication information 812 used by Authentication Module 804, in some implementations, may be any form of authentication information, whether audience class information, access list information, groups information, directory structure information, and the like.

In some embodiments, the Authentication Module 804 may be responsible for determining whether a particular user or application is authorized to access a given encrypted file.

In one embodiment, Encryption Module 805 may be responsible for encrypting 45 the data file 23 into the encrypted file 31. The Encryption Module 805 may use any form of encryption known in the art. In some implementations, the Encryption Module 805 may add tags or additional information to the metadata associated with encrypted file 31.

The secure data manager 41, in some embodiments, may operate in communication with a centralized service, such as the centralize service 24 described in relation to FIGS. 2A through 2F. The centralized service, for example, may provide services for securing file transfer between an external storage provider and a number of computing devices.

Figure 8A:
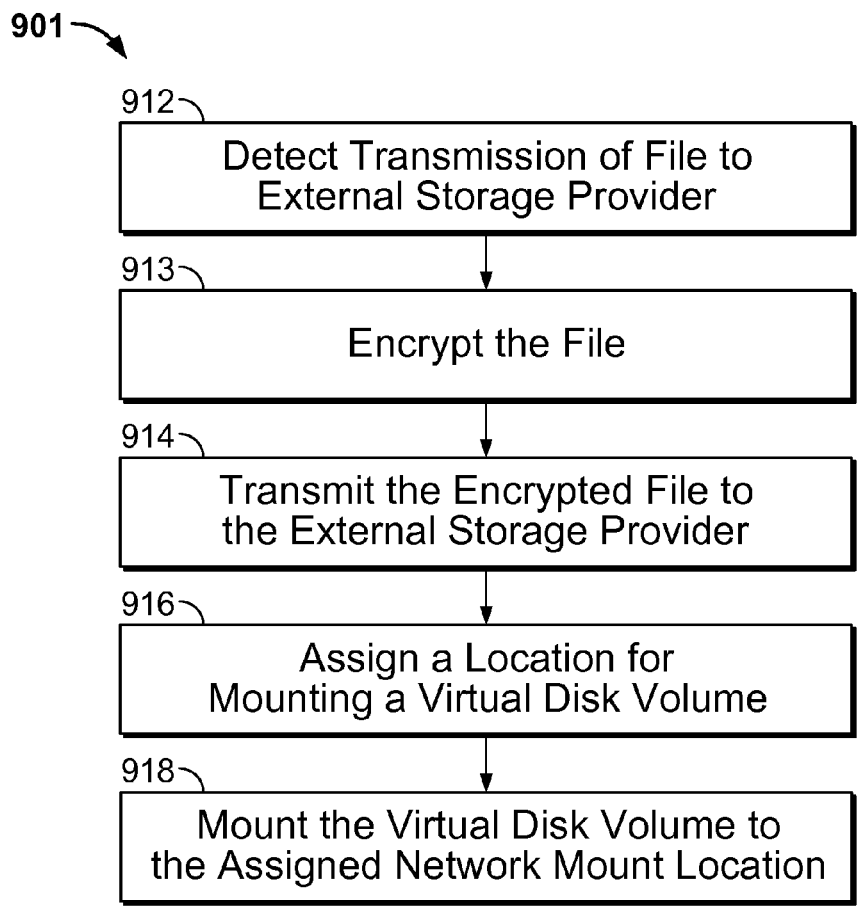
FIGS. 8A-8B are flow diagrams depicting methods for providing security to file storage by an external storage provider involving encryption and decryption.

Referring now to FIG. 8A, an embodiment of a method 901 for securing a file for transmission to an external storage provider is depicted. In some implementations, the method 901 may be performed in part by a secure data manager such as the secure data manager 41 described in relation to FIGS. 6A through 6C and FIG. 7. The method 901, in some implementations, may begin with detecting transmission of a file to an external storage provider (912). In some embodiments, a secure data manager may detect transmission of a file to an external storage provider by operating as a listener process that waits and responds to an attempted transmission of a file to an external storage provider. In some embodiments, a secure data manager may operate on an intermediary network machine. In some embodiments, all internet traffic may be routed to particular network nodes capable of detecting transmission of files to external storage providers. In some embodiments, detection of transmission of a file to an external storage provider may be accomplished at a network firewall or other network appliance. In some embodiments, detection of transmission of a file to an external storage provider may occur at a client computing device, one or more computing devices on an enterprise network, or one or more computing devices accessible to the network over the Internet.

In some implementations, the file may be encrypted (913). In some embodiments, a secure data manager may encrypt a file by utilizing a unique encryption key generated specifically for encrypting the file. In some implementations, a file may be encrypted at an intermediary network device, any computing device on the enterprise network, two or more computing devices, or one or more computing device accessible via the Internet. A secure data manager may accomplish encrypting the file in consultation with a centralized service, a key generator, a key store, an access list, and audience class database, or any other authentication or encryption services or resources.

The encrypted file, in some embodiments, may be transmitted to an external storage provider (914). In some embodiments, a secure data manager may transmit the encrypted file to an external storage provider by transmitting the encrypted file over the Internet. In some embodiments, a secure data manager may transmit the encrypted file to the external storage provider by sending a request to the external storage provider to upload the encrypted file to a particular location. In some embodiments, the encrypted file may be temporarily stored somewhere on the client machine or enterprise network, and the encrypted file may be transmitted to the external storage provider according to a predetermined schedule or synchronization protocol.

In some implementations, a location may be assigned for mounting a virtual disk volume exposed by the external storage provider (916). In some embodiments, a secure data manager may assign a location for mounting a virtual disk volume including a copy or representation of the stored encrypted file. In some embodiments, the location for mounting the virtual disk may be assigned by using network mounting protocols available on two or more operating systems. In some embodiments, a particular process or application may act as a network drive for mounting a virtual disk. In other embodiments, a process or application may provide a copy or representation of an encrypted file, stored by the external storage provider, to a user.

The virtual disk volume, in some implementations, may be mounted to the assigned location (918). In some embodiments, the secure data manager may mount the virtual disk volume to the assigned location. In some embodiments, the virtual disk volume may be mounted by using network mounting protocols available on two or more operating systems. In some embodiments, the virtual disk volume may be mounted by running a particular process or application that acts as a network drive. In other embodiments, the virtual disk volume may be mounted by running a process or application that provides a copy or representation of a file stored by an external storage provider or an encrypted file stored by the external storage provider to a user. In some embodiments, mounting a virtual disk volume may refer to making available, by any means, a copy or representation of a file stored by an external storage provider to a user, process, or application. A virtual disk volume may be mounted at any node in a network, on a client machine, a user's desktop, a network drive, or any other location on a network where a copy or representation of a file stored by an external storage provider may be located.

Figure 8B:
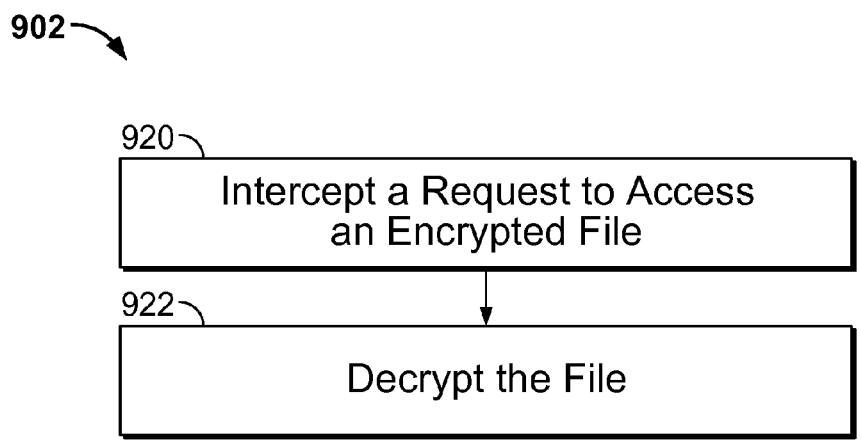

Referring now to FIG. 8B, an embodiment of a method 902 for accessing a secure file stored by an external storage provider via a virtual disk volume is depicted. In some implementations, the method 901 may be performed in part by a secure data manager such as the secure data manager 41. In some implementations, the method 901 may begin with intercepting a request to access an encrypted file (920). In some embodiments, a secure data manager may intercept a request to access an encrypted file by running as a listener process that waits for a request and responds to it. In some embodiments, interception of the request may occur at a client computing device, one or more intermediary network computing devices, machines, or appliances, or one or more computing devices accessible across the Internet. In some embodiments, intercepting the request may be accomplished by routing all network traffic through particular nodes on a network capable of intercepting requests to access an encrypted file. In some embodiments, intercepting the request may be accomplished by running a process or application that monitors virtual disk volumes mounted to the enterprise network. In some embodiments, intercepting the request may be accomplished by an application or process running on one or more client computing devices.

In some implementations, the file is decrypted (922). In some embodiments, the secure data manager may decrypt the file by consulting a centralized service. In some embodiments, the secure data manager may decrypt the file by using a unique key generated for the encrypted file. In some embodiments, the file may be decrypted by consulting an audience class database, an access list, a key store, and key generator, or any other application or resource available for encryption and authentication. Decryption of the file may occur at an intermediary network computing device, any computing device one the enterprise network, two or more computing devices, or one or more computing devices accessible via the Internet. In some embodiments, the secure data manager may decrypt the file responsive to a determination that a user, application, or process is authorized to access either an encrypted file or a particular location.

Figure 8C:
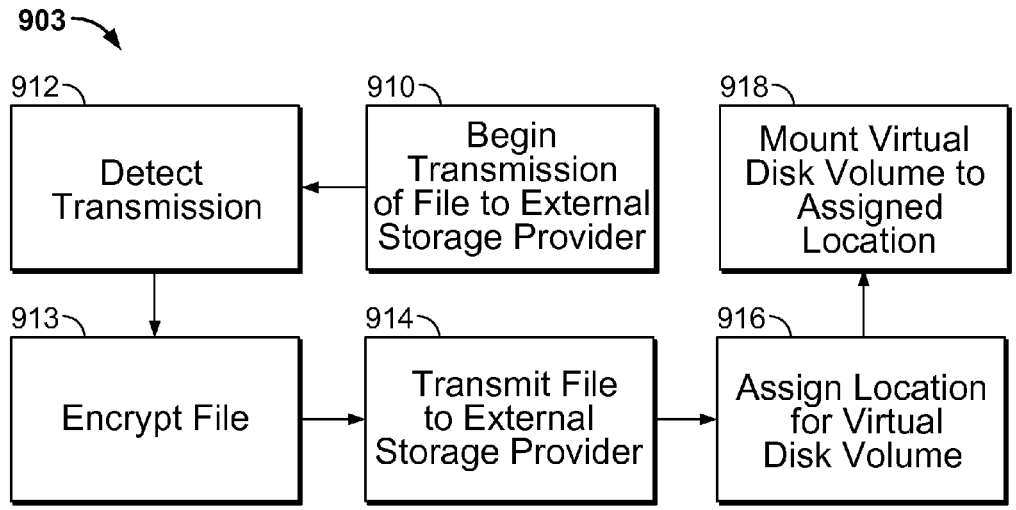
FIGS. 8C-8D are process diagrams depicting methods for providing security to file storage by an external storage provider involving encryption and decryption.

Referring now to FIG. 8C, an embodiment of a method 903 for securing a file for transmission to an external storage provider is depicted. The method 903, in some implementations, may be performed by a security agent process or application. The security agent 22, for example as described in relation to FIGS. 2A through 2F, may perform one or more steps of the method 903. As the method 903 shares many of the same steps as method 901 described in relation to FIG. 8A, only the steps not described in relation to FIG. 8A are described in detail below.

In some implementations, the method 903 may begin with beginning transmission of a file to an external storage provider (910). In some implementations, a client machine, user, application, or process may begin transmission of the file to the external storage provider from an enterprise network.

In some implementations, transmission of a file to an external storage provider may be detected (912). In some implementations, the file may be encrypted (913). The encrypted file, in some embodiments, may be transmitted to an external storage provider (914). In some implementations, a location may be assigned for mounting a virtual disk volume exposed by the external storage provider (916). The virtual disk volume, in some implementations, may be mounted to the assigned location (918).

Figure 8D:
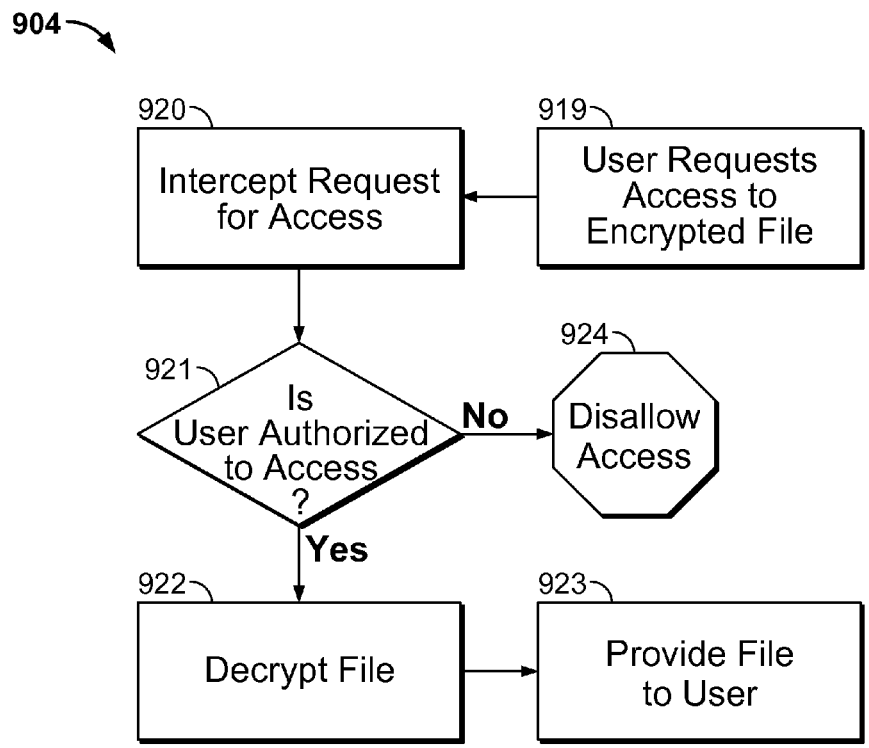

Referring now to FIG. 8D, an embodiment of a method 904 for accessing a secure file stored by an external storage provider via a mounted virtual disk volume is depicted. The method 904, in some implementations, may be performed in part by a security agent process or application. The security agent 22, for example as described in relation to FIGS. 2A through 2F, may perform one or more steps of the method 904. As the method 904 shares many of the same steps as method 902 described in relation to FIG. 8B, only the steps not described in relation to FIG. 8B are described in detail below.

In some implementations, the method 904 may begin with issuance of a request from a user to access an encrypted file (919). In some embodiments, a user may request access to the encrypted file via the virtual disk volume mounted on the network. In some embodiments, a request to access an encrypted file stored by an external storage provider may be made by an application or process.

In some implementations, a request to access an encrypted file may be intercepted (920). In some implementations, a determination may be made as to whether the requestor is authorized to access the encrypted file (921). In some implementations, the secure data manager may determine whether the user, application, or process is authorized to access the location of the virtual disk volume. If the requestor is not authorized to access the given location (921), in some implementations, the requestor may be disallowed access to the location and thus disallowed access to the file (924). If, instead, the user is authorized to access the given location (921), in some implementations, the file is decrypted (922).

In some implementations, the decrypted file may be provided to the requestor (923). For example, the secure data manager may provide the decrypted file to the user, application or process that issued the request for the encrypted file.

Figure 9A:
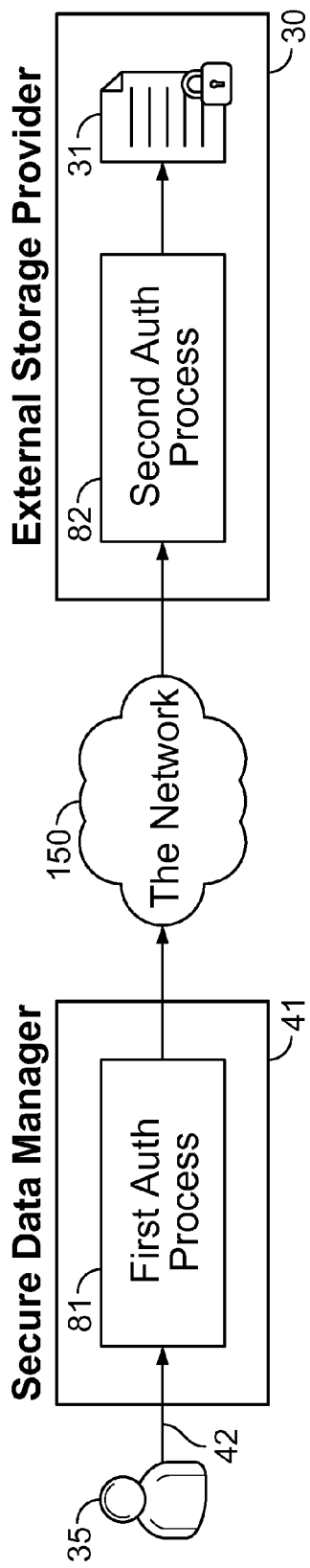
FIG. 9A is a process diagram of an embodiment of a system for authenticating users to access secured files stored by an external storage provider.

Referring now to FIG. 9A, an embodiment for authenticating access to files stored by an external storage provider is depicted. A user 35, in some embodiments, may make the request 42 for a file stored by the external storage provider 30. In some implementations, the secure data manager 41 may implement a first authentication process 81 to determine that the user 35 is authorized to access the encrypted file 31 stored by the external storage provider 30. The external storage provider 30, in some implementations, may implement a second authentication process 82 to determine that the user 35 is authorized to access the encrypted file 31.

In some embodiments, the first authentication process 81 may involve determining that a particular user is authorized to access a particular location. The first authentication process 81 may also, in some implementations, involve determining that the particular user is authorized to access the encrypted file 31 itself.

In some embodiments, the first authentication process 81 may determine that a particular application, process or machine, is authorized to access a particular location or encrypted file.

In some embodiments, the second authentication process 82 may determine that a particular application, process or machine, is authorized to access a particular location or encrypted file.

Figure 9B:
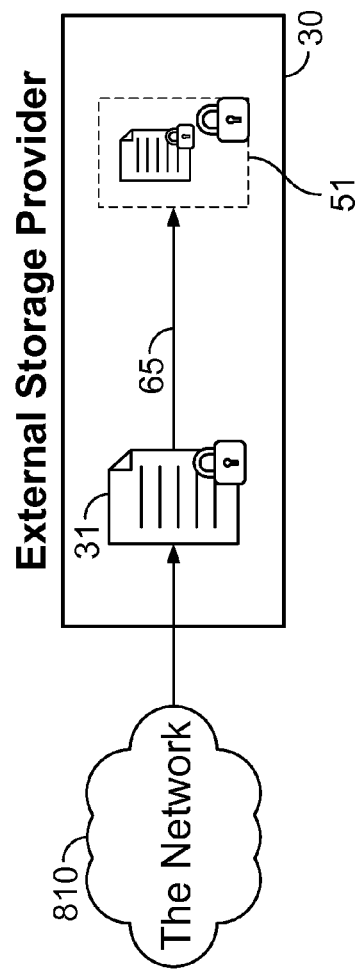
FIG. 9B is a process diagram depicting an embodiment of a system for further encryption of secured files by an external storage provider.

Referring now to FIG. 9B, an embodiment of a system for further encrypting an encrypted file at the external storage provider is depicted. The external storage provider 30 may receive the encrypted file 31 from the enterprise network 810. The external storage provider 30 may further encrypt 65 the encrypted file 31 into encrypted file 51. The external service provider 30 may similarly decrypt encrypted file 51 into encrypted file 31 upon a request from the enterprise network 810 to access the file 31.

In some embodiments, the external storage provider 30 may further encrypt 65 the encrypted file 31 before the encrypted file 31 leaves the enterprise network 810 and before transmission over the public Internet (e.g., the network 150 as shown in FIG. 9A). In such embodiments, the external storage provider 30 may decrypt the encrypted file 51 upon a request to access the file 31 only after the encrypted file 51 has been transmitted back to the enterprise network 810 over the public Internet.

Figure 10A:
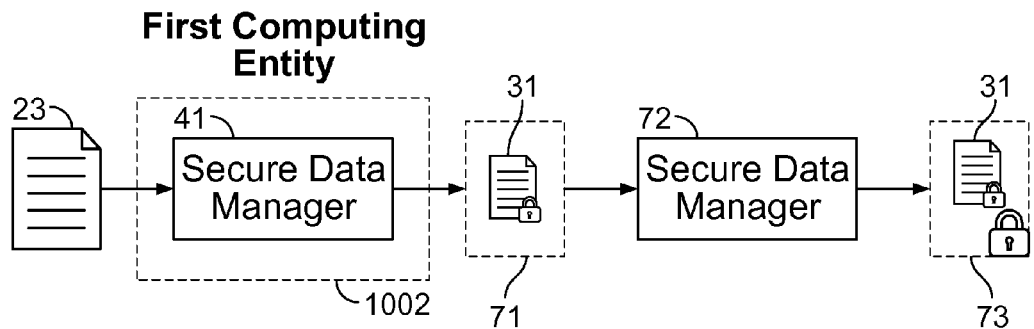
FIGS. 10A-10C are process diagrams depicting an embodiment of a system for providing multiple layers of security for data storage.

Referring now to FIG. 10A, an embodiment of a system for providing multiple layers of security for data storage is shown. In some implementations, data file 23 may be encrypted by secure data manager 41 as encrypted file 31, and encrypted file 31 may be stored at a storage location 71. A second secure data manager 72, in some implementations, may then encrypt the storage location 71 into encrypted storage location 73, which includes encrypted data file 31. The secure data manager 41, in some implementations, may execute within a first computing entity 1002. The secure data manager 72, in some implementations, may execute under the control of a second computing entity (not shown). The first computing entity 1002 and the second computing entity may be any computing device, server, server farm, combination of networked computing devices, or any combination thereof. In some embodiments, the first computing entity 1002 may be a client computing device such as the client machine 10 described in relation to FIGS. 1A through 1C, and the second computing entity may be a different machine on the same local area network or enterprise network, such as machine 18 described in relation to FIGS. 1B and 1C. In other embodiments, the first computing entity 1002 may be a computing device such as machine 18 and the second computing entity may be a computing device accessed over the Internet external to the enterprise network. The first computing entity 1002 and the second computing entity may also be configured as a combination of computing devices, servers, server farms, combination of networked computing devices, servers, server farms, or any combination thereof.

Figure 10B:
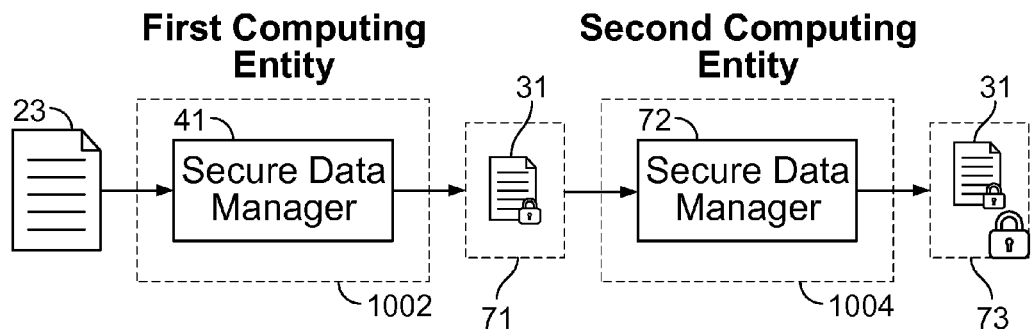

Referring now to FIG. 10B, an embodiment of a system for providing multiple layers of security for data storage is shown. Data file 23, in some implementations, may be encrypted by secure data manager 41 and stored at storage location 71. Secure data manager 72, in some implementations, may then encrypt the storage location 71 into encrypted storage location 73, which includes encrypted data file 31. The secure data manager 41, in some implementations, may execute within the first computing entity 1002. The secure data manager 72, in some implementations, may execute within a second computing entity 1004.

Figure 10C:
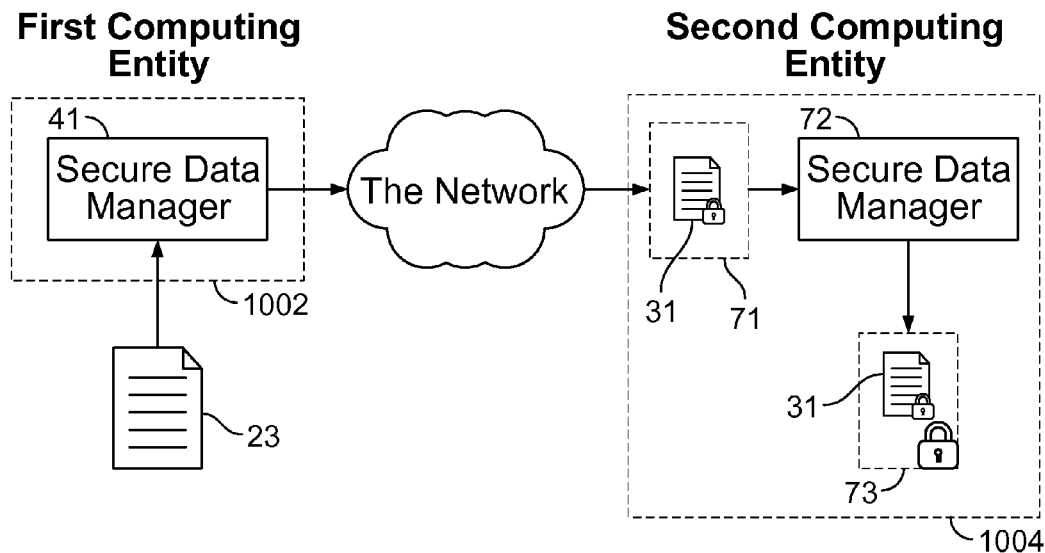

Referring now to FIG. 10C, an embodiment of a system for providing multiple layers of security for data storage is shown. In some embodiments, data file 23 may be encrypted by secure data manager 41 and stored at storage location 71. Secure data manager 72, in some embodiments, may then encrypt the storage location 71 into encrypted storage location 73, which includes encrypted data file 31. The secure data manager 41, in some implementations, may execute within the first computing entity 1002. The secure data manager 71, in some embodiments, may execute within the second computing entity 1004. The storage location 71, in some embodiments, may be located within the second computing entity 1004. In some embodiments, the secure data manager 72 may not execute within the second computing entity 1004, but instead may execute elsewhere but under the control of the second computing entity 1004. In some embodiments, the encrypted storage location 73 may be accessed via a virtual disk volume (not illustrated).

Although illustrated as separate secure data managers 41 and 72, In some embodiments, the secure data manager 41 and the secure data manager 72 may be the same (e.g., combined) secure data manager. The combined secure data manager may execute either within the first computing entity or the second computing entity. In some embodiments, secure data manager 41 may execute both within the first computing entity and under the control of the second computing entity.

Figure 11:
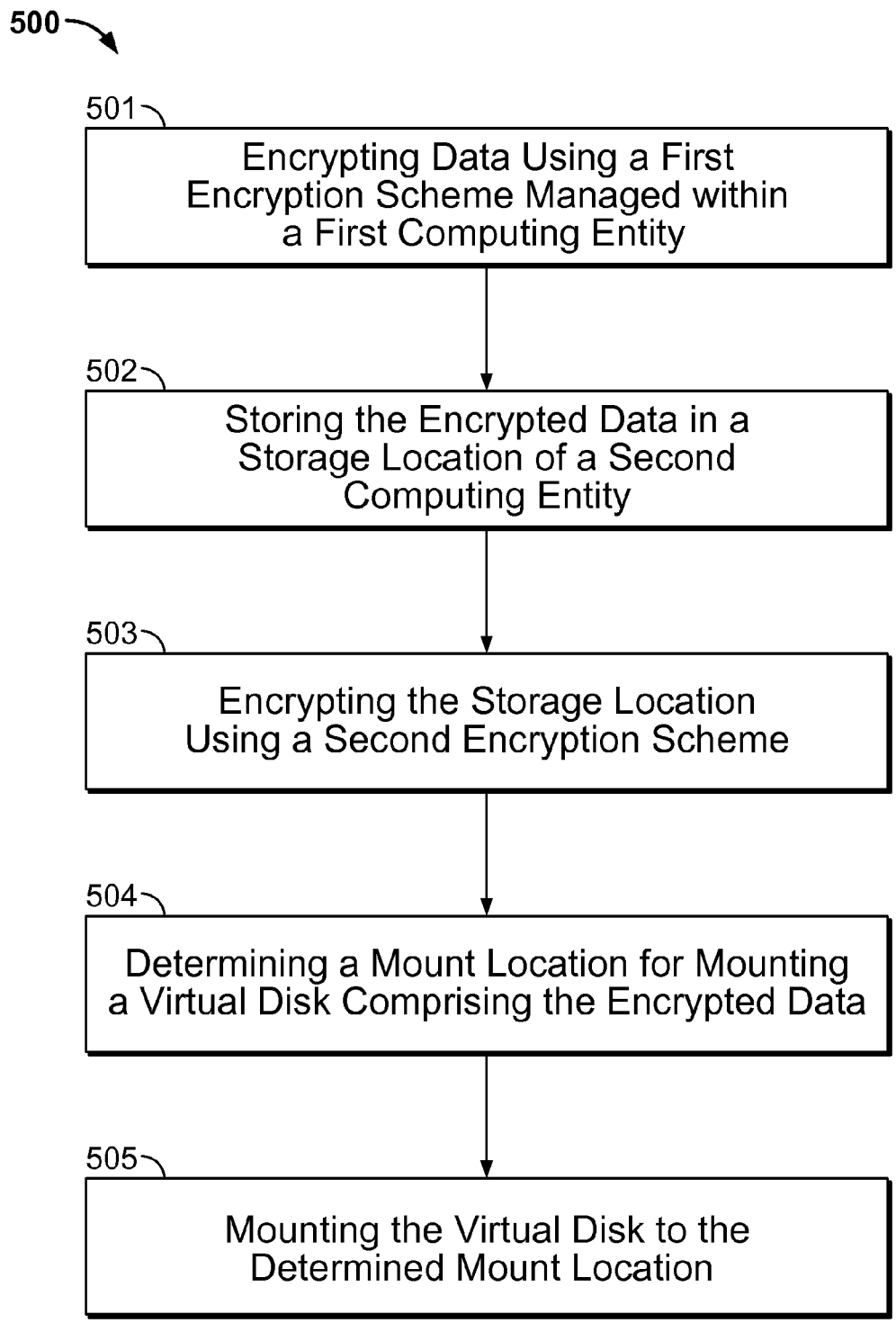
FIG. 11 is a flow diagram depicting methods for providing multiple layers of security for data storage.

Referring now to FIG. 11, an embodiment of a method 500 for providing multiple layers of security for data storage is shown. The method 500 may begin, in some implementations, with encrypting data using a first encryption scheme managed within a first computing entity (501). In some embodiments, the first computing entity may be any form of computing device or combination of computing devices. In some embodiments, the first computing entity may be a client machine such as the client machine 10 described in relation to FIGS. 1A through 1C, a machine on an enterprise network such as machine 18 described in relation to FIGS. 1B and 1C, a server, a server farm, or a combination of networked computing devices, machines, or servers. Data, in some embodiments, may be encrypted using two or more encryption schemes. In some embodiments, a secure data manager such as the secure data manager 41, described in relation to FIGS. 10A through 10C, may use a first encryption scheme managed within a first computing entity to encrypt the data. In some embodiments, the secure data manager may execute within the first computing entity. In other embodiments, the secure data manager may execute under the control of the first computing entity, but not within the first computing entity. In some embodiments, the secure data manager may execute within a second computing entity.

In some embodiments, encrypting using the first encryption scheme may further include encrypting using a first encryption scheme having at least one encryption algorithm and at least one encryption key.

In some embodiments, a secure data manager may be referred to as a secure data manager, a security data manager, or a data security manager.

In some implementations, the encrypted data may be stored in a storage location of a second computing entity (502). In some embodiments, the encrypted data may be stored in a storage location of a second computing entity accessible across a network. In some embodiments, the storage location need not be within the second computing entity. In some embodiments, the storage location may simply be under the control of the second computing entity, rather than within the second computing entity. In some embodiments, the storage location may be a secured storage location. In some embodiments, the storage location may be a storage location provided by an external storage provider. In some embodiments, the storage location may be accessed by an application or process provided by the second computing entity. In some embodiments, the storage location may be accessed via a virtual disk volume, such as the virtual disk volume 40 described in relation to FIG. 6C and FIG. 7.

In some implementations, the storage location may be encrypted using a second encryption scheme (503). In some embodiments, a secure data manager may encrypt the storage location using a second encryption scheme. The storage location, in some embodiments, may be encrypted using two or more encryption schemes. In some embodiments, the second encryption scheme may be the same as the first encryption scheme. In other embodiments, the second encryption scheme may be different from the first encryption scheme. In some embodiments, the storage location may be encrypted by a first secure data manager executing under the control of the first computing entity rather than a second secure data manager that executes under the control of a second computing entity. In some embodiments, an external storage provider may encrypt the storage location. In other embodiments, a computing device within an enterprise network, such as machine 18 described in relation to FIGS. 1A and 1B, may encrypt the storage location.

In some embodiments, encrypting using the second encryption scheme may include encrypting using a second encryption scheme having at least one encryption algorithm and at least one encryption key.

In some implementations, a mount location for mounting a virtual disk including the encrypted data may be determined (504). In some embodiments, a secure data manager executing within a first computing entity may determine the mount location for a virtual disk volume. The determined location, in some implementations, may provide a link to the secured storage location. The determined location, in some examples, may be a location on a computing device, machine, or server. The determined location, in some embodiments, may be any location accessible to a user across an enterprise network. The determined location, in some embodiments, may also be any location accessible by a user across a WAN or the Internet. In some embodiments, a second secure data manager executing under the control of a second computing entity may determine the mount location for a virtual disk volume.

In some implementations, a virtual disk may be mounted to the determined mount location (505). In some embodiments, a first secure data manager executing within a first computing entity may mount the virtual disk volume to the determined location. In some embodiments, a second secure data manager executing under the control of a second computing entity may mount the virtual disk volume to the determined location. In some embodiments, a virtual disk volume may provide a link to the storage location. A virtual disk volume, for example, may take any form of a virtual disk volume commonly known in the art or described herein.

In some embodiments, the first secure data manager and the second secure data manager may be the same secure data manager. The combined secure data manager may execute either within the first computing entity or within the second computing entity. In some embodiments, the first secure data manager may execute both within the first computing entity and under the control of the second computing entity.

In some embodiments, storing in the storage location may further include storing in a storage location within a second computing entity. In some embodiments, such as storage location may be accessible across a LAN, WAN, the Internet, or a combination of a LAN, WAN, or the Internet. In some embodiments, the second computing entity may be provided by an external storage provider.

In some embodiments, the method 500 may further include unmounting the virtual disk responsive to an indication that access to secure data is no longer required. In some embodiments, the virtual disk volume may be unmounted by a secure data manager. In some embodiments, a virtual disk volume may be set to expire according to a previously scheduled time. In other embodiments, a user may command the unmounting of a virtual disk volume.

In some embodiments, the method 500 may further include decrypting the encrypted storage location. For example, the secure data manager, executing under the control of the second computing entity, may decrypt the encrypted storage location. In some embodiments, the secure data manager, executing within the first computing entity, may perform the step of decrypting the encrypted storage location.

In some embodiments, the method 500 may further include decrypting the encrypted data. For example, the first secure data manager, executing within the first computing entity, may decrypt the encrypted data. In some embodiments, the second secure data manager, executing under the control of the second computing entity, may decrypt the encrypted data.

In some embodiments, the first secure data manager may execute under the control of the second computing entity while executing within the first computing entity.

In some embodiments, the method 500 may further include assigning a secured network mount location for mounting the virtual disk volume. In some embodiments, the secure network mount location may be secured by a secure data manager. In some embodiments, the secure network mount location may be secured by an underlying operating system or independent security process dedicated to securing mount locations.

In some embodiments, the method 500 may further include performing at least one encryption operation at least substantially in real time. In some embodiments, the method 500 may further include performing at least on decryption operation at least substantially in real time. In some embodiments, real-time encryption may be performed by one or more secure data managers.

Having described certain embodiments of systems and methods for multiple layers of security, it will now become apparent to one of skill in the art that other embodiments incorporating the concepts of the invention may be used.

What is claimed is:

1. A method comprising:
  detecting, by a processor of a computing device, a network communication regarding transmission of a file for storage within an external storage provider network wherein the file is transmitted from a first private network, and the external storage provider network is outside of the first private network;
  causing, by the processor, encryption of the file to obtain an encrypted file, wherein an external storage provider is denied decrypted access to the encrypted file;
  associating, by the processor, authorization information with the encrypted file, wherein the authorization information comprises one or more restrictions on access to the encrypted file;
  transmitting the encrypted file for storage by the external storage provider within the external storage provider network;
  after transmitting, intercepting, by the processor, a request for access to the file;
  identifying, by the processor, requestor information regarding a requestor associated with the request, wherein
    the request for access is initiated within a second private network, and
    the external storage provider network is outside of the second private network;
  determining, by the processor, using the requestor information and a portion of the authorization information, that the requestor is authorized to access the encrypted file;
  causing, by the processor, decryption of the encrypted file to obtain the original file; and providing, to the requestor, by the processor, access to the original file.

2. The method of claim 1, wherein the authorization information comprises an audience class.

3. The method of claim 1, wherein the authorization information comprises an access list.

4. The method of claim 1, further comprising:
prior to transmitting the encrypted file for storage by the external storage provider, causing encryption of an encryption key to obtain an encrypted encryption key; wherein
the encrypted encryption key is transmitted for storage by the external storage provider.

5. The method of claim 4, wherein causing decryption of the encrypted file comprises:
causing, by the processor, decryption of the encrypted encryption key to obtain the original encryption key; and
causing, by the processor, decryption of the encrypted file using the original encryption key.

6. The method of claim 1, wherein associating authorization information with the encrypted file comprises adding authorization information to a metadata portion of the encrypted file.

7. The method of claim 6, wherein determining that the requestor is authorized to access the encrypted file comprises:
accessing the authorization information in the metadata portion of the encrypted file; and
referencing the requestor information to the authorization information.

8. The method of claim 7, further comprising transmitting the request to access the file to the external storage provider.

9. The method of claim 8, wherein determining that the requestor is authorized to access the encrypted file occurs prior to transmitting the request to access the file.

10. The method of claim 1, wherein:
detecting the network communication regarding transmission of the file comprises intercepting the network communication originating within the first private network, wherein
the computing device forms a portion of the first private network is private in relation to a public network; and
transmitting the encrypted file comprises transmitting the encrypted file to the external storage provider network across the public network.

11. The method of claim 10, further comprising monitoring, by the processor, traffic within the first private network.

12. The method of claim 1, further comprising:
determining, by the processor, a storage location of the encrypted file, wherein the storage location comprises a location managed by the external storage provider; and
causing, by the processor, encryption of the storage location.

13. The method of claim 12, wherein causing encryption of the storage location comprises instructing a process executing on a second computing device to encrypt the storage location, wherein the external storage provider comprises the second computing device.

14. The method of claim 1, wherein providing access to the original file comprises providing a file indicator to the requestor, wherein the file indicator comprises a location of the original file.

15. The method of claim 14, further comprising:
mounting, by the processor, a virtual disk volume;
wherein the location of the original file comprises a location on the virtual disk volume.

16. The method of claim 1, wherein the first private network is the second private network.

17. A system comprising:
a processor; and
a memory storing instructions thereon, wherein the instructions when executed cause the processor to:
intercept, within a private network, a network communication regarding transmission of a file, wherein
the network communication originated within the private network, and
the network communication comprises a destination address of an external storage provider, wherein
a second network comprises the external storage provider, and
the second network is outside of the private network;
responsive to interception of the network communication, cause encryption of the file to obtain an encrypted file, wherein
the external storage provider is denied decrypted access to the encrypted file;
determine an encryption key to associate with the encrypted file; and
provide the encrypted file and the encryption key for storage by the external storage provider.

18. The system of claim 17, wherein the instructions, when executed, further cause the processor to, prior to transmitting the encrypted file and the encryption key, encrypt the encryption key using a shared key.

19. A non-transient computer readable medium having instructions stored thereon that, when executed, cause a processor to:
intercept, from a process associated with an external storage provider, a request for access to a file, wherein
the file is stored within a private network, and
a second network, outside of the private network, comprises the external storage provider;
identify a requestor as having encryption-only access to the file, wherein the requestor is associated with the request;
assign authentication information to the file, wherein the authentication information comprises one or more restrictions on access to the file;
cause encryption of the file to obtain an encrypted file, wherein
the file is encrypted using a first encryption key;
add an indication of the authentication information to the encrypted file;
cause encryption of a second encryption key to obtain an encrypted encryption key, wherein the second encryption key is encrypted using a shared key; and
allow the requestor to access the encrypted file and the encrypted encryption key, wherein
the instructions are performed on behalf of an entity other than the external storage provider, and
the external storage provider is disallowed access to the first encryption key, the second encryption key, and the shared key.

20. The computer readable medium of claim 19, wherein the first encryption key is the second encryption key.

* * * * *